US00RE46160E

(19) United States
(12) Reissued Patent
Okamoto

(10) Patent Number: US RE46,160 E
(45) Date of Reissued Patent: *Sep. 20, 2016

(54) INFORMATION TRANSMITTING APPARATUS AND METHOD, INFORMATION RECEIVING APPARATUS AND METHOD, INFORMATION TRANSMITTING AND RECEIVING SYSTEM AND METHOD, RECORDING MEDIUM AND PROGRAM

(71) Applicant: Sony Corporation, Tokyo (JP)

(72) Inventor: Hiroshige Okamoto, Kanagawa (JP)

(73) Assignee: Sony Corporation (JP)

( * ) Notice: This patent is subject to a terminal disclaimer.

(21) Appl. No.: 13/936,843

(22) Filed: Jul. 8, 2013

Related U.S. Patent Documents

Reissue of:
(64) Patent No.: 8,064,361
Issued: Nov. 22, 2011
Appl. No.: 12/586,756
Filed: Sep. 28, 2009

U.S. Applications:
(63) Continuation of application No. 13/934,892, filed on Jul. 3, 2013, now Pat. No. Re. 45,434, which is an application for the reissue of Pat. No. 8,064,361, which is a continuation (Continued)

(30) Foreign Application Priority Data

Mar. 12, 2001 (JP) ..... P2001-067969

(51) Int. Cl.
*H04L 12/28* (2006.01)
*H04N 7/083* (2006.01)
*H04J 1/16* (2006.01)

(52) U.S. Cl.
CPC ..... *H04N 7/083* (2013.01)

(58) Field of Classification Search
CPC ..... H04N 7/083
USPC ..... 370/252, 487, 535
See application file for complete search history.

(56) References Cited

U.S. PATENT DOCUMENTS 4,589,018 A 5/1986 Haskell et al.
4,680,647 A 7/1987 Moriyama (Continued)

FOREIGN PATENT DOCUMENTS

EP 1 032 200 A2 8/2000
EP 1 231 795 A2 8/2002

(Continued)

OTHER PUBLICATIONS

EIC 2600 Search Report.

(Continued)

*Primary Examiner* — John Pezzlo
(74) *Attorney, Agent, or Firm* — Lerner, David, Littenberg, Krumholz & Mentlik, LLP

(57) ABSTRACT

An original blanking period of a video signal is shortened to a set blanking period, and audio data is multiplexed into a resulting superimposing period. Table distinguishing data indicating the length of the superimposing period is inserted into the period as a blanking signal. With this configuration, it is possible to enable transmission and reception of an audio signal in a system capable of transmitting and receiving a video signal.

28 Claims, 17 Drawing Sheets

Related U.S. Application Data of application No. 11/724,770, filed on Mar. 16, 2007, now Pat. No. 7,688,868, which is a continuation of application No. 10/095,848, filed on Mar. 12, 2002, now Pat. No. 7,209,496.

(56) References Cited

U.S. PATENT DOCUMENTS

| | | | | |
|---|---|---|---|---|
| 5,523,795 | A * | 6/1996 | Ueda | H04N 7/56 348/472 |
| 5,796,441 | A | 8/1998 | Oshita et al. | |
| 5,929,921 | A | 7/1999 | Taniguchi et al. | |
| 5,940,070 | A | 8/1999 | Koo | |
| 6,151,334 | A | 11/2000 | Kim et al. | |
| 6,243,469 | B1 | 6/2001 | Kataoka et al. | |
| 6,297,797 | B1 * | 10/2001 | Takeuchi et al. | 345/467 |
| 6,437,824 | B1 | 8/2002 | Suzuki et al. | |
| RE37,879 | E | 10/2002 | Takeuchi | |
| 6,678,333 | B1 | 1/2004 | Yamashita | |
| 7,096,487 | B1 * | 8/2006 | Gordon et al. | 725/91 |
| 7,499,545 | B1 * | 3/2009 | Bagshaw | 380/212 |
| 7,499,628 | B2 | 3/2009 | Yuen et al. | |
| 2001/0036193 | A1 * | 11/2001 | Kori | 370/402 |
| 2002/0171761 | A1 * | 11/2002 | Suzuki et al. | 348/484 |
| 2002/0199149 | A1 | 12/2002 | Nagasaki et al. | |
| 2003/0145336 | A1 * | 7/2003 | Matsuzaki et al. | 725/136 |
| 2009/0052471 | A1 | 2/2009 | Pasqualino et al. | |
| 2014/0078155 | A1 | 3/2014 | MacInnis et al. | |

FOREIGN PATENT DOCUMENTS

| | | | |
|---|---|---|---|
| EP | 1303145 | | 4/2003 |
| EP | 1303145 | A1 | 4/2003 |
| JP | 4-284084 | | 10/1992 |
| JP | 5-219488 | | 8/1993 |
| JP | 06-78280 | | 3/1994 |
| JP | 6-121313 | | 4/1994 |
| JP | 9-046661 | | 2/1997 |
| JP | 9-179536 | | 7/1997 |
| JP | 2002-281464 | | 9/2002 |
| WO | 97/48056 | A1 | 12/1997 |
| WO | 99/12306 | A1 | 3/1999 |
| WO | 00/14626 | A1 | 3/2000 |
| WO | 02/09443 | A1 | 1/2002 |

OTHER PUBLICATIONS

"PanelLink NV: The Digital Solution for HDTV White Paper", Silicon Image, Feb. 2001, p. 1-12 http://www.siliconimage.com/docs/Si I-WP-003-A.pdf.

European Search Report, EP 10172873, dated Nov. 3, 2010.

EIC 2600 Search Report dated Dec. 4, 2013.

Fibush, D.K., "Integrating Digital Audio Into the Serial Digital Video Signal", SMPTE Journal, vol. 103, No. 9, Sep. 1, 1994, pp. 574-579.

"Digital Visual Interface DVI Revision 1.0", DDWG (Digital Display Working Group), Apr. 1999, p. 24-32 http://www.ddwg.org/.

European Search Report, EP 10172870, dated Nov. 3, 2010.

European Search Report, EP 10172881, dated Nov. 3, 2010.

* cited by examiner

Data Channel A
Data Channel B
Data Channel C
Clock Channel
83A
ENCODER
83B
ENCODER
83C
ENCODER
86
SUPERIMPOSING PERIOD TABLE
82A
ENCRYPTING UNIT
82B
ENCRYPTING UNIT
82C
ENCRYPTING UNIT
81A
81B
81C
84
BUFFER
85
TIMING GENERATION UNIT
87
PLL CIRCUIT
43
80A
PIXEL DATA A
91
H/V SYNC
80B
PIXEL DATA B
92
CONTROL SIGNAL
80C
PIXEL DATA C
93
AUDIO DATA
94
BLANKING SIGNAL
95
PIXEL CLOCK
8
2

FIG. 6

| C1 | C0 | CTL Code |
|---|---|---|
| 0 | 0 | 0010101011 |
| 0 | 1 | 1101010100 |
| 1 | 0 | 0010101010 |
| 1 | 1 | 1101010101 |

INFORMATION TRANSMITTING APPARATUS AND METHOD, INFORMATION RECEIVING APPARATUS AND METHOD, INFORMATION TRANSMITTING AND RECEIVING SYSTEM AND METHOD, RECORDING MEDIUM AND PROGRAM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED REISSUE APPLICATIONS*

*This application is a continuation reissue of application Ser. No. 13/934,892, which is an application for reissue of U.S. Pat. No. 8,064,361, and is related to application Ser. No. 13/936,825 and application Ser. No. 13/936,871, which are continuation reissues of application Ser. No. 13/934,892, which is an application for reissue of U.S. Pat. No. 8,064,361.*

CROSS-REFERENCE TO RELATED APPLICATIONS

The present application is a continuation of U.S. patent application Ser. No. 11/724,770, filed Mar. 16, 2007, which is a continuation of U.S. patent application Ser. No. 10/095,848, filed Mar. 12, 2002 and which claims priority from Japanese Application No. 2001-067969 filed Mar. 12, 2001, the disclosures of which are hereby incorporated by reference herein.

BACKGROUND OF THE INVENTION

The present invention relates to an apparatus and a method for transmitting information, an apparatus and a method for receiving information, a system and a method for transmitting and receiving information, a recording medium and a program, and particularly to an apparatus and a method for transmitting information, an apparatus and a method for receiving information, a system and a method for transmitting and receiving information, a recording medium and a program that make it possible to transmit audio data more efficiently by multiplexing the audio data into video data.

A blanking period of video data is often used when the video data has other data superimposed thereon for transmission. In teletext broadcasting, text data is inserted into a vertical blanking period, for example.

Since the blanking period is extremely short as compared with a period for transmitting original video data, however, types of data capable of being multiplexed are limited to low-volume data such as text data.

SUMMARY OF THE INVENTION

The present invention has been made in view of the above, and it is accordingly an object of the present invention to enable efficient transmission of data such as, for example, audio data which is low in volume as compared with video data, but high in volume as compared with text data or the like.

According to a first aspect of the present invention, there is provided an information transmitting apparatus including a first capturing unit operable to capture a video signal; a second capturing unit operable to capture a compressed audio signal; a setting unit operable to set a blanking period of the video signal to a predetermined period of a length different from an original period; a multiplexing unit operable to multiplex the compressed audio signal into a differential period corresponding to a difference between the blanking period of the video signal and the predetermined period set by the setting unit; and a video signal transmitter operable to transmit the video signal having the compressed audio signal multiplexed therein.

The setting unit may set the blanking period to the predetermined period by disposing a blanking signal representing the blanking period only in the predetermined period other than the differential period of the blanking period of the video signal.

The blanking signal may form a control signal.

The information transmitting apparatus may further include a retaining unit operable to retain information on the differential period or the predetermined period, and the multiplexing unit may multiplex the compressed audio signal into the differential period on the basis of the information retained by the retaining unit.

The retaining unit may retain a correspondence between a type of the video signal and the differential period or the predetermined period as the information on the differential period or the predetermined period.

The information transmitting apparatus may further include a distinguishing information transmitter operable to transmit distinguishing information for distinguishing the differential period or the predetermined period.

The distinguishing information transmitting unit may transmit the distinguishing information in the predetermined period of the video signal as a type of blanking signal representing a blanking period.

The distinguishing information transmitting unit may transmit the distinguishing information in a vertical blanking period.

The distinguishing information transmitting unit may transmit the distinguishing information via a transmission line different from a transmission line of the video signal.

The distinguishing information may be information allowing determination of a period from a start point to an end point of the predetermined period or a period from a start point to an end point of the differential period.

The information transmitting apparatus may further include a compressing unit operable to compress the audio signal.

The information transmitting apparatus may further include an encrypting unit operable to encrypt the audio signal by a method common with the video signal.

According to a second aspect of the present invention, there is provided an information transmitting method, including capturing a video signal; capturing a compressed audio signal; setting a blanking period of the video signal to a predetermined period of a length different from an original period; multiplexing the compressed audio signal into a differential period corresponding to a difference between the blanking period of the video signal and the predetermined period set by the setting step; and transmitting the video signal having the compressed audio signal multiplexed therein.

According to a third aspect of the present invention, there is provided a recording medium recorded with a computer readable program for transmitting information, the program including capturing a video signal; capturing a compressed audio signal; setting a blanking period of the video signal to a predetermined period of a length different from an original period; multiplexing the compressed audio signal into a differential period corresponding to a difference between the blanking period of the video signal and the predetermined period set by the setting step; and transmitting the video signal having the compressed audio signal multiplexed therein.

According to a fourth aspect of the present invention, there is provided a system for performing an information transmission process, including a processor for executing instructions; and instructions, the instructions including capturing a video signal; capturing a compressed audio signal; setting a blanking period of the video signal to a predetermined period of a length different from an original period; multiplexing the compressed audio signal into a differential period corresponding to a difference between the blanking period of the video signal and the predetermined period set by the setting step; and transmitting the video signal having the compressed audio signal multiplexed therein.

According to a fifth aspect of the present invention, there is provided an information receiving apparatus including a receiver operable to receive a transmitted signal; a first capturing unit operable to capture a video signal from the received signal; a detecting unit operable to detect a blanking period of the captured video signal, the blanking period being set to a length different from an original period; a second capturing unit operable to capture information on a multiplexing period in which a compressed audio signal is multiplexed; a third capturing unit operable to capture the multiplexed compressed audio signal from the captured video signal on the basis of the captured information on the multiplexing period; and a correcting unit operable to correct the detected blanking period on the basis of the captured information on the multiplexing period.

The information receiving apparatus may further include a converting unit operable to convert the compressed audio signal captured by the third capturing unit into a continuous signal.

A blanking signal representing the blanking period may form a control signal.

The information receiving apparatus may further include a retaining unit operable to retain the information on the multiplexing period, and the second capturing unit may capture the information on the multiplexing period from the information retained by the retaining unit.

The retaining unit may retain a correspondence between a type of the video signal and the multiplexing period as the information on the multiplexing period.

The information receiving apparatus may further include a distinguishing information extracting unit operable to extract distinguishing information for distinguishing the multiplexing period.

The distinguishing information extracting unit may extract the distinguishing information from a blanking signal representing the blanking period, the blanking signal being inserted in the blanking period of the video signal.

The distinguishing information extracting unit may extract the distinguishing information from the blanking signal in a vertical blanking period.

The distinguishing information extracting unit may extract the distinguishing information from a signal received via a transmission line different from a transmission line of the video signal.

The distinguishing information may be information allowing determination of a period from a start point to an endpoint of the multiplexing period or a period from a start point to an end point of the blanking period being set to the length different from the original period.

The information receiving apparatus may further include an expanding unit operable to expand the compressed audio signal.

The information receiving apparatus may further include a decrypting unit operable to decrypt the audio signal by a method common with the video signal, the audio signal being encrypted by a method common with the video signal.

According to a sixth aspect of the present invention, there is provided an information receiving method including receiving a transmitted signal; capturing a video signal from the received signal; detecting a blanking period of the captured video signal, the blanking period being set to a length different from an original period; capturing information on a multiplexing period in which a compressed audio signal is multiplexed; capturing the multiplexed compressed audio signal from the captured video signal on the basis of the captured information on the multiplexing period; and correcting the detected blanking period on the basis of the captured information on the multiplexing period.

According to a seventh aspect of the present invention, there is provided a recording medium recorded with a computer readable program for receiving information, the program including receiving a transmitted signal; capturing a video signal from the received signal; detecting a blanking period of the captured video signal, the blanking period being set to a length different from an original period; capturing information on a multiplexing period in which a compressed audio signal is multiplexed; capturing time multiplexed compressed audio signal from the captured video signal on the basis of the captured information on the multiplexing period; and correcting the detected blanking period on the basis of the captured information on the multiplexing period.

According to an eighth aspect of the present invention, there is provided a system for performing information reception, including a processor for executing instructions; and instructions, the instructions including receiving a transmitted signal; capturing a video signal from the received signal; detecting a blanking period of the captured video signal, the blanking period being set to a length different from an original period; capturing information on a multiplexing period in which a compressed audio signal is multiplexed; capturing the multiplexed compressed audio signal from the captured video signal on the basis of the captured information on the multiplexing period; and correcting the detected blanking period on the basis of the captured information on the multiplexing period.

According to a ninth aspect of the present invention, there is provided an information transmitting and receiving system, including an information transmitting apparatus; and an information receiving apparatus; the information transmitting apparatus including a first capturing unit operable to capture a video signal; a second capturing unit operable to capture a compressed audio signal; a setting unit operable to set a blanking period of the video signal to a predetermined period of a length different from an original period; a multiplexing unit operable to multiplex the compressed audio signal into a differential period corresponding to a difference between time blanking period of the video signal and the predetermined period set by the setting unit; and a video signal transmitter operable to transmit the video signal having the compressed audio signal multiplexed therein; and the information receiving apparatus including a receiver operable to receive a signal transmitted from the information transmitting apparatus; a third capturing unit operable to capture the video signal from the received signal; a detecting unit operable to detect the blanking period of the captured video signal, the blanking period being set to the predetermined period; a fourth capturing unit operable to capture information on the differential period; a fifth capturing unit operable to capture time multiplexed compressed audio signal from time captured video signal on the basis of the captured information on the differential period; and a correcting unit operable to correct the detected blanking period on the basis of the captured information on the differential period.

According to a tenth aspect of the present invention, there is provided an information transmitting and receiving method, including capturing a video signal; capturing a compressed audio signal; setting a blanking period of the video signal to a predetermined period of a length different from an original period; multiplexing the compressed audio signal into a differential period corresponding to a difference between the blanking period of the video signal and the predetermined period set by the setting step; transmitting the video signal having the compressed audio signal multiplexed therein; receiving the transmitted signal; capturing the video signal from the received signal; detecting the blanking period of the captured video signal, the blanking period being set to the predetermined period; capturing information on the differential period; capturing the multiplexed compressed audio signal from the captured video signal on the basis of the captured information on the differential period; and correcting the detected blanking period on the basis of the captured information on the differential period.

According to an eleventh aspect of the present invention, there is provided a recording medium recorded with a program for transmitting and receiving information, the program including capturing a video signal; capturing a compressed audio signal; setting a blanking period of the video signal to a predetermined period of a length different from an original period; multiplexing the compressed audio signal into a differential period corresponding to a difference between the blanking period of the video signal and the predetermined period set by the setting step; transmitting the video signal having the compressed audio signal multiplexed therein; receiving the transmitted signal; capturing the video signal from the received signal; detecting the blanking period of the captured video signal, the blanking period being set to the predetermined period; capturing information on the differential period; capturing the multiplexed compressed audio signal from the captured video signal on the basis of the captured information on the differential period; and correcting the detected blanking period on the basis of the captured information on the differential period.

According to a twelfth aspect of the present invention, there is provided a system for performing information transmission and reception processes, including a processor for executing instructions; and instructions, the instructions including capturing a video signal; capturing a compressed audio signal; setting a blanking period of the video signal to a predetermined period of a length different from an original period; multiplexing the compressed audio signal into a differential period corresponding to a difference between the blanking period of the video signal and the predetermined period set by the setting step; transmitting the video signal having the compressed audio signal multiplexed therein; receiving the transmitted signal; capturing the video signal from the received signal; detecting the blanking period of the captured video signal, the blanking period being set to the predetermined period; capturing information on the differential period; capturing the multiplexed compressed audio signal from the captured video signal on the basis of the captured information on the differential period; and correcting the detected blanking period on the basis of the captured information on the differential period.

The apparatus and method for information transmission, and the program according to the present invention, multiplex the compressed audio signal into the differential period created by setting the blanking period of the video signal to the predetermined period.

The apparatus and method for information reception, and the program according to the present invention, capture the compressed audio signal superimposed in the multiplexing period of the received video signal, and correct the blanking period on the basis of the multiplexing period.

The system and method for information transmission and reception, and the program according to the present invention, multiplex the compressed audio signal into the differential period of the video signal, and thereby transmit the compressed audio signal from the information transmitting apparatus. The information receiving apparatus captures the compressed audio signal multiplexed in the differential period, and corrects the blanking period on the basis of the differential.

BRIEF DESCRIPTION OF THE DRAWINGS

FIG. 6 is a diagram showing an example of blanking data;

DETAILED DESCRIPTION

Preferred embodiments of the present invention will hereinafter be described in detail with reference to the drawings.

Figure 1:
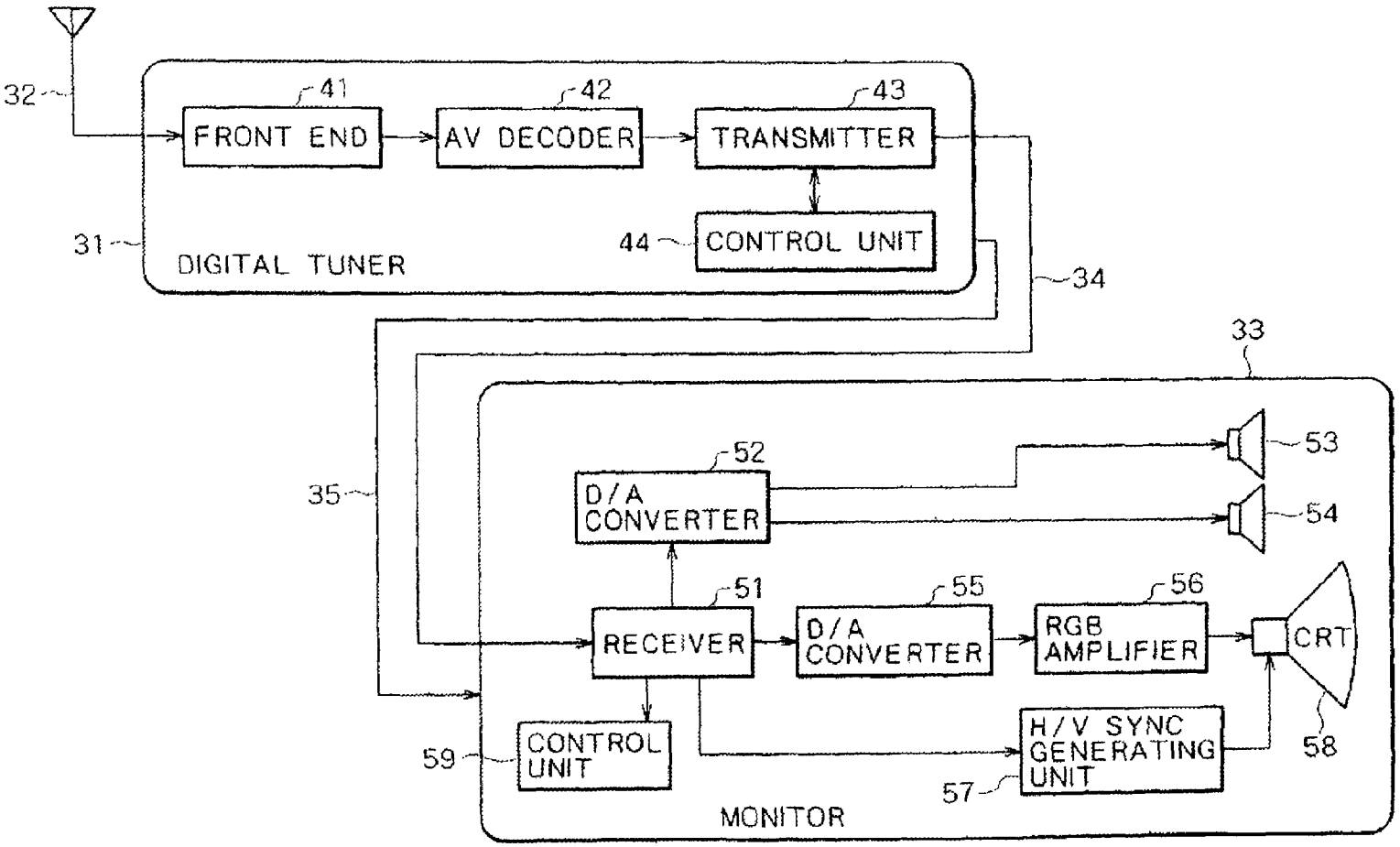
FIG. 1 is a block diagram showing a configuration of an information transmitting and receiving system to which the present invention is applied.

FIG. 1 shows an example of a configuration of a transmitting and receiving system to which the present invention is applied. A digital tuner 31 receives a broadcast radio wave via an antenna 32, and supplies a demodulated output to a monitor 33 through a TMDS (Transition Minimized Differential Signaling) cord 34 (hereinafter described simply as a TMDS 34) based on DVI (Digital Video Interface) standards. The digital tuner 31 is also connected to the monitor 33 by a DDC (Display Data Channel) bus 35 (hereinafter described simply as a DDC 35) based on the DVI standards.

The digital tuner 31 has a front end 41. The front end 41 demodulates the broadcast wave received via the antenna 32, and then outputs video data and audio data (hereinafter also referred to as AV data) obtained by demodulating the broadcast wave to an AV decoder 42. The AV decoder 42 decodes the AV data supplied from the front end 41, and then outputs the result to a transmitter 43. The transmitter 43 is controlled by a control unit 44, and outputs the AV signal supplied from the AV decoder 42 to the monitor 33 via the TMDS 34.

The monitor 33 incorporates a receiver 51. The receiver 51 receives the AV data supplied from the transmitter 43 of the digital tuner 31 via the TMDS 34, and then separates audio data, video data, and synchronizing data.

The audio data output from the receiver 51 is subjected to D/A conversion by a D/A converter 52, and then output from left-channel and right-channel speakers 53 and 54.

The video data output from the receiver 51 is subjected to D/A conversion by a D/A converter 55, amplified by an RGB amplifier 56, and output to a CRT 58.

An H/V sync generating unit 57 generates a horizontal synchronizing signal and a vertical synchronizing signal on the basis of the synchronizing data supplied from the receiver 51, and then supplies the horizontal synchronizing signal and the vertical synchronizing signal to a driving circuit of the CRT 58.

Figure 2:
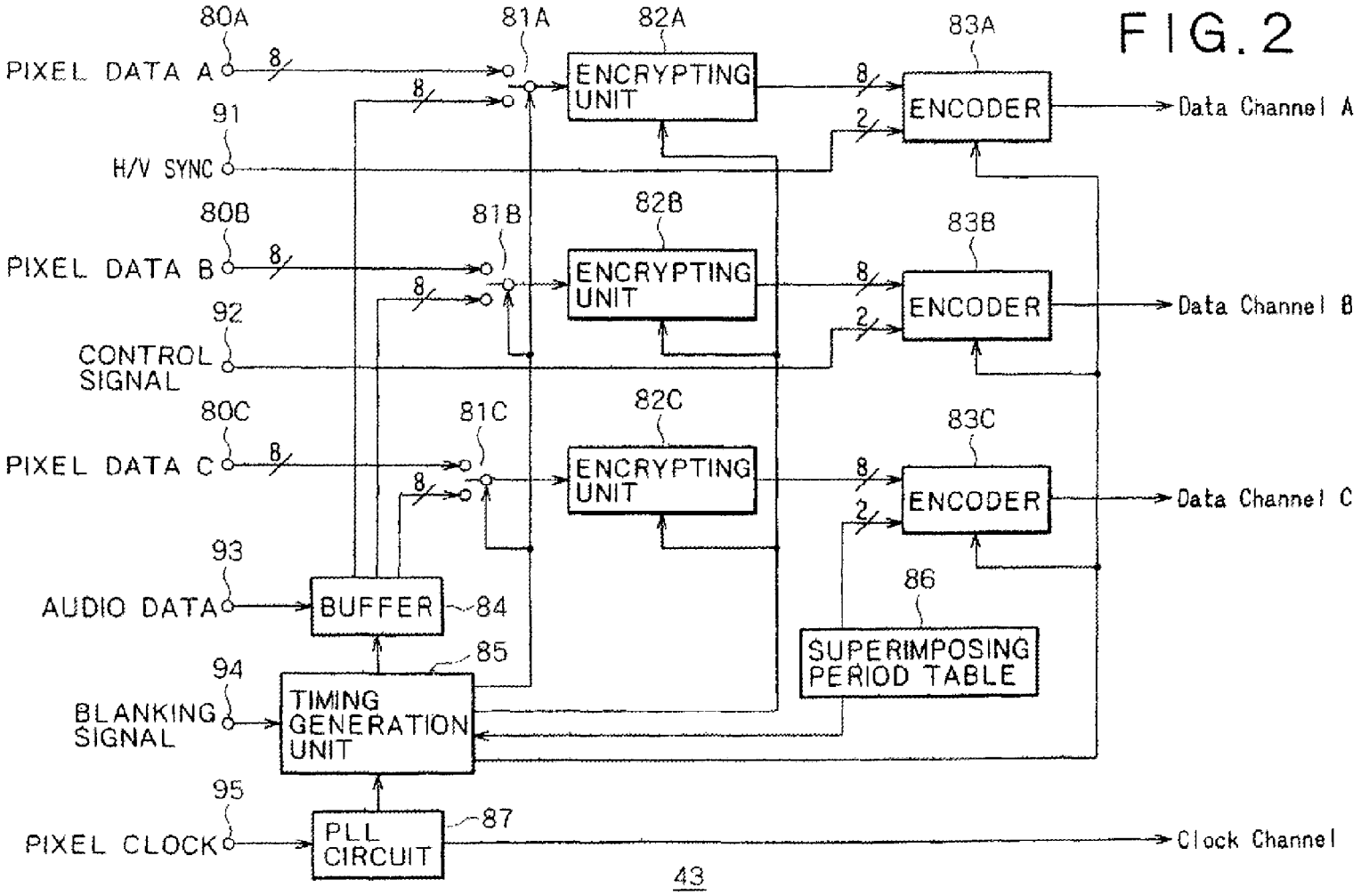
FIG. 2 is a block diagram showing a configuration of a transmitter in FIG. 1.
Figures 3A, 3B, 3C, 3D, 3E, 3F:
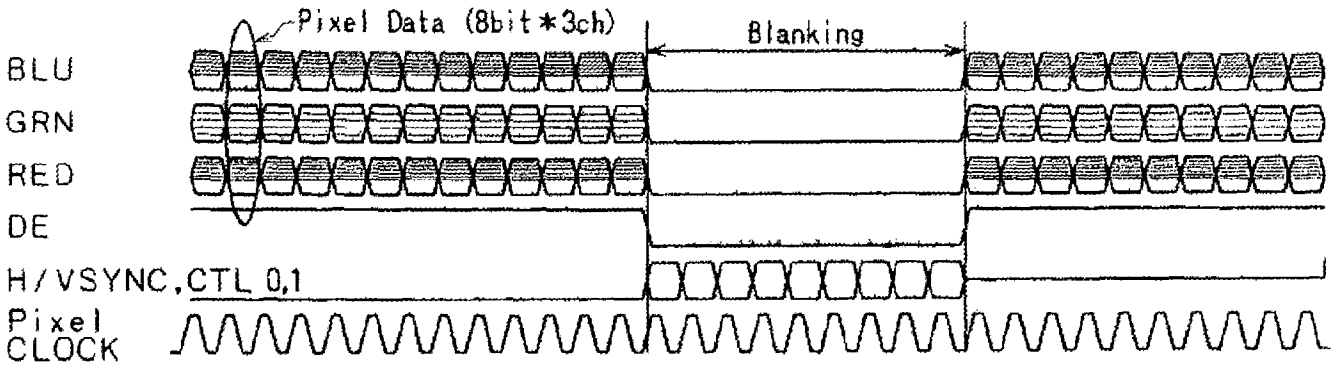
FIGS. 3A, 3B, 3C, 3D, 3E, and 3F are diagrams of assistance in explaining signals input to the transmitter of FIG. 2.

FIG. 2 shows an example of a configuration of the transmitter 43. Pixel data A, pixel data B, and pixel data C (for example blue (B), green (G), or red (R) pixel data as shown in FIG. 3A, 3B, or 3C, respectively) for three channels A, B, and C, which data forms the video data output from the AV decoder 42, are supplied from terminals 80A, 80B, and 80C to the upper input terminals (as viewed in the figure) of switches 81A, 81B, and 81C, respectively. The pixel data of each of the colors (channels) for one pixel is expressed as data of 8 bits.

A terminal 91 is supplied with data of 2 bits forming horizontal synchronizing data and vertical synchronizing data. The 2-bit data is supplied to an encoder 83A.

A terminal 92 is supplied with data of 2 bits forming a control signal (CTL0, CTL1) as shown in FIG. 3E, for example. The 2-bit data is supplied to an encoder 83B.

A terminal 93 is supplied with audio data, in this example, as data to be superimposed (multiplexed). The audio data input from the terminal 93 is stored temporarily by a buffer 84, and then supplied as data in units of 8 bits to the lower input terminal (as viewed in FIG. 2) of the switch 81A, 81B, or 81C.

A terminal 94 is supplied with a blanking signal indicating a blanking period as shown in FIG. 3D. The blanking signal is supplied to a timing generation unit 85.

A terminal 95 is supplied with a pixel clock of 25 MHz to 165 MHz as shown in FIG. 3F. The pixel clock is supplied to a PLL circuit 87. The pixel clock is in synchronization with each of the pixels of the channels A, B, and C. The PLL circuit 87 generates a clock of a frequency ten times that of the input pixel clock in synchronization with the pixel clock, and then supplies the generated clock to the timing generating unit 85. The PLL circuit 87 also outputs a stable pixel clock to the monitor 33.

The timing generating unit 85 generates a timing signal to control the buffer 84, the switches 81A, 81B, and 81C, and encrypting units 82A, 82B, and 82C in synchronization with the blanking signal and the pixel clock. The timing generating unit 85 also sets (shortens) the blanking signal to a predetermined length, and supplies the set blanking signal to encoders 83A, 83B, and 83C.

The switches 81A, 81B, and 81C are each turned to the upper input terminal or the lower input terminal in the figure on the basis of the timing signal supplied from the timing generating unit 85 to select the pixel data A to C or the audio data. The switches 81A, 81B, and 81C output the selected pixel data or audio data to their corresponding encrypting units 82A, 82B, and 82C, respectively.

The encrypting units 82A, 82B, and 82C encrypt the video data (pixel data) or the audio data input thereto by a common algorithm, and then output the results to their corresponding encoders 83A, 83B, and 83C.

A superimposing period table 86 prestores data on length of a horizontal blanking period and length of a vertical blanking period corresponding to the pixel data to be output from the encoders 83A to 83C.

For example, when pixel data to be encoded and output is 480p (the number represents the number of scanning lines, and p denotes a progressive system), the horizontal blanking period corresponds to a length of 138 pixels, When pixel data to be encoded and output is 720p, the length of the horizontal blanking period corresponds to 370 pixels. When pixel data to be encoded and output is 1080i (i denotes an interlacing system), the length of the horizontal blanking period corresponds to 280 pixels.

That is to say, data for displaying position (length) of a horizontal blanking period and position (length) of a vertical blanking period corresponding to the displaying system are stored in the superimposing period table 86.

The timing generating unit 85 turns the switches 81A and 81C to the lower side thereof (as viewed in the figure) to select audio data for a superimposing period (multiplexing period) stored in the superimposing period table 86.

During a period when the blanking signal set by the timing generating unit 85 (hereinafter referred to as the set blanking signal) is not supplied, the encoder 83A encodes the 8-bit pixel data A or audio data supplied from the encrypting unit 82A on the basis of a predetermined algorithm, and then outputs the result as 10-bit data of the data channel A.

During a period when the set blanking signal is input (hereinafter referred to as a set blanking period), the encoder 83A encodes (generates) 10-bit blanking data on the basis of the 2-bit horizontal synchronizing signal or vertical synchronizing signal input from the terminal 91, and then outputs the blanking data as data of the data channel A.

As with the encoder 83A, during the period other than the set blanking period, the encoder 83B or 83C encodes the pixel data or audio data input from the encrypting unit 82B or 82C, respectively, and then outputs the result as 10-bit data. During the set blanking period, the encoder 83B encodes (generates) 10-bit blanking data on the basis of the 2-bit control signal input from the terminal 92, and the encoder 83C encodes (generates) 10-bit blanking data on the basis of 2-bit data indicating the superimposing period supplied from the superimposing period table 86. The output of the encoder 83B and the output of the encoder 83C are transmitted to the monitor 33 as an output of the data channel B and an output of the data channel C, respectively.

In addition, the pixel clock generated by the PLL circuit 87 is transmitted to the monitor 33 as data of a clock channel.

Figure 4:
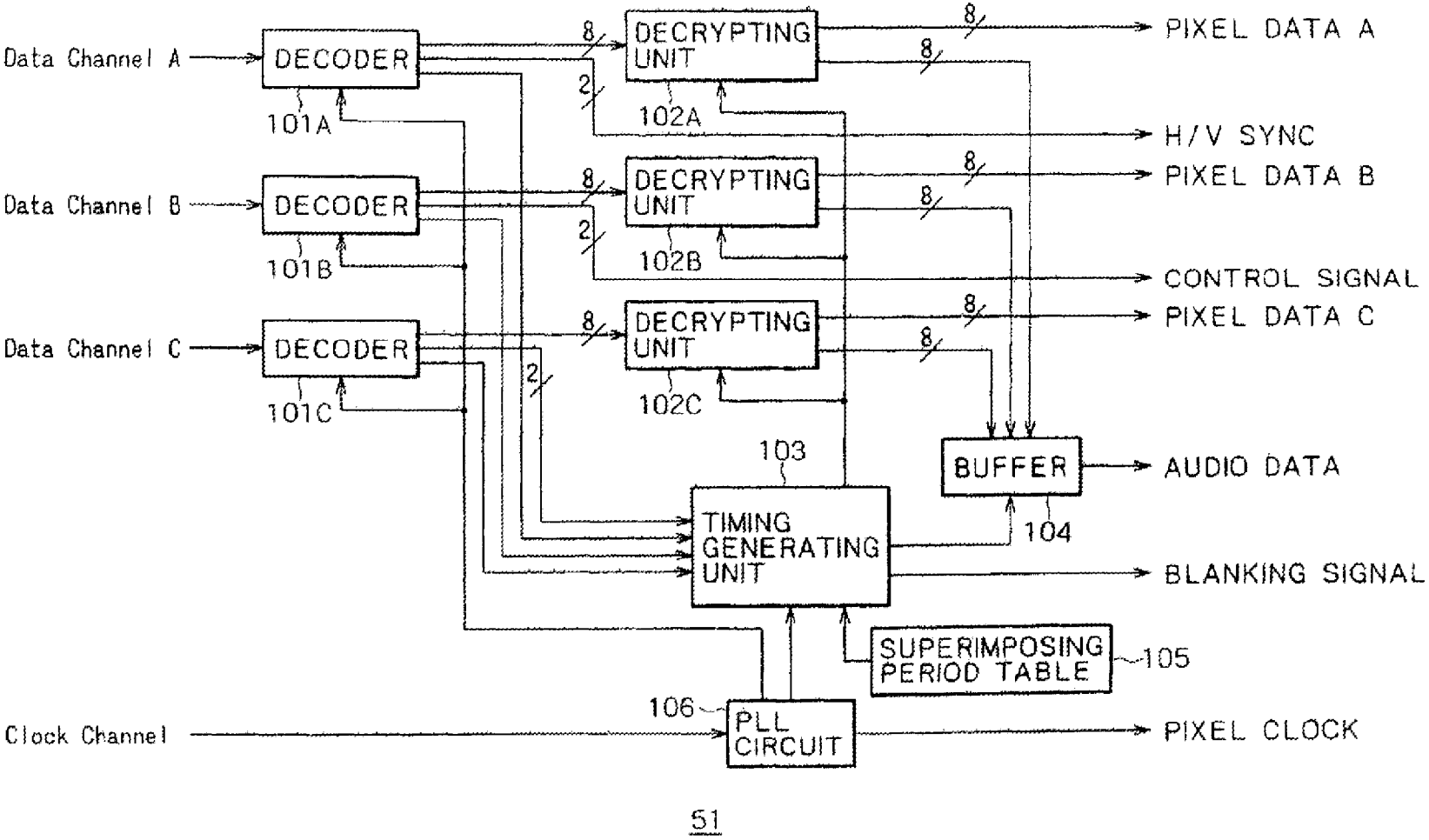
FIG. 4 is a block diagram showing a configuration of a receiver in FIG. 1.

FIG. 4 shows a configuration of the receiver 51. Decoders 101A to 101C receive the 10-bit data of the data channels A to C, respectively, decode the 10-bit data, and then output the results as 8-bit data. The decoders 101A to 101C are supplied with a clock of a frequency ten times that of the pixel clock input to the clock channel in synchronization with the pixel clock, which clock of the frequency ten times that of the pixel clock is generated by a PLL circuit 106.

Eight-bit pixel data A or audio data decoded by the decoder 101A is supplied to a decrypting unit 102A. When the 10-bit blanking data is input, the decoder 101A converts the 10-bit blanking data into 2-bit horizontal synchronizing data or vertical synchronizing data, and then supplies the 2-bit horizontal synchronizing data or vertical synchronizing data to the H/V sync generating unit 57.

Eight-bit pixel data B or audio data output by the decoder 101B is supplied to a decrypting unit 102B. When the 10-bit blanking data is input, the decoder 101B converts the 10-bit blanking data into a 2-bit control signal, and then supplies the 2-bit control signal to a control unit 59 of the monitor 33.

Eight-bit pixel data C or audio data output by the decoder 101C is supplied to a decrypting unit 102C. When the 10-bit blanking data is input, the decoder 101C converts the 10-bit blanking data into 2-bit data indicating the superimposing period, and then supplies the 2-bit data to a timing generating unit 103.

The decoders 101A to 101C also output the set blanking signal (Data Enable) indicating the set blanking period to the timing generating unit 103. The timing generating unit 103 extends the set blanking period and thus generates a blanking signal of an original length by referring to a superimposing period table 105 (the same table as the superimposing period table 86 in FIG. 2 is retained), and then outputs the blanking signal to the H/V sync generating unit 57. The timing signal generating unit 103 is supplied with a stabilized pixel clock (clock of the same frequency as that of the pixel clock input to the terminal 95 of the transmitter 43) generated by the PLL circuit 106 in synchronization with the data of the clock channel. The timing generating unit 103 generates a timing signal on the basis of these pieces of data input thereto, and supplies the timing signal to the decrypting units 102A to 102C and a buffer 104.

The decrypting units 102A to 102C decrypt the 8-bit pixel data A or audio data, the pixel data B or audio data, and the pixel data C or audio data input thereto, respectively, and then output the pixel data to the D/A converter 55.

The 8-bit audio data decrypted by the decrypting units 102A to 102C is supplied to the buffer 104 to be converted into continuous data, and then output to the D/A converter 52.

The blanking signal generated by the timing generating unit 103 is supplied to the H/V sync generating unit 57 in conjunction with the pixel clock of the frequency 1/10 that of the clock supplied to the decoders 101A to 101C, which pixel clock is generated by the PLL circuit 106 (clock of the same frequency as that of the pixel clock input to the terminal 95 of the transmitter 43 in FIG. 2).

The operation of the transmitting and receiving system will next be described. When the front end 41 of the digital tuner 31 receives a radio wave of a channel specified by a user via the antenna 32, the front end 41 of the digital tuner 31 demodulates the received signal, and then outputs the demodulated signal to the AV decoder 42. The AV decoder 42 decodes the received signal input thereto, and then outputs decoded audio data and video data to the transmitter 43. The transmitter 43 multiplexes the audio data into the horizontal blanking period of the video data input thereto, and then outputs the result to the monitor 33 via the TMDS 34.

The TMDS 34 is essentially an interface for personal computers, and therefore is in a format not allowing transmission of audio data. In this case, however, the audio data is multiplexed into the blanking period of the video data, and therefore the audio data can be transmitted via the TMDS 34.

The receiver 51 on the monitor 33 side receives the video data transmitted via the TMDS 34, separates the audio data inserted in the blanking period, and then outputs the audio data to the D/A converter 52. The D/A converter 52 converts the audio data input thereto into analog audio signals for a left and a right channel to be output from the speakers 53 and 54.

Horizontal synchronizing data and vertical synchronizing data also extracted and generated from the blanking period by the receiver 51 are supplied to the H/V sync generating unit 57. The H/V sync generating unit 57 generates a horizontal synchronizing signal and a vertical synchronizing signal on the basis of the data input thereto, and then outputs the horizontal synchronizing signal and the vertical synchronizing signal to the driving circuit of the CRT 58.

The receiver 51 also outputs pixel data extracted from the data input thereto to the D/A converter 55 to subject the pixel data to D/A conversion. RGB signals output from the D/A converter 55 (signals of the pixel data A to C) are amplified by the RGB amplifier 56, and then supplied to the CRT 58 for display. In this case, the CRT 58 is controlled in the scanning of scanning lines on the basis of the horizontal synchronizing signal and the vertical synchronizing signal generated by the H/V sync generating unit 57.

Transmission processing on the channel A of the transmitter 43 in FIG. 2 will next be described with reference to the flowchart of FIG. 5.

At a step S1, the timing generation unit 85 determines whether the timing generation unit 85 is now in a blanking period on the basis of input from the terminal 94. When the timing generation unit 85 is not in a blanking period, the processing proceeds to a step S2, at which the timing generation unit 85 generates a switch control signal and then outputs the switch control signal to the switch 81A to turn the switch 81A to the upper input terminal (as viewed in FIG. 2). The switch 81A thereby selects the pixel data A input from the terminal 80A (B data of RGB data, for example), and then supplies the pixel data A to the encrypting unit 82A.

At a next step S5, the encrypting unit 82A encrypts the data selected by the switch 81A (pixel data A in this case). At a step S6, the encoder 83A encodes the pixel data A encrypted by the encrypting unit 82A at the step S5, and at a step S8, the encoder 83A outputs the encoded data to the TMDS 34 as data of the data channel A.

When the timing generation unit 85 determines at the step S1 that the timing generation unit 85 is now in a blanking period, on the other hand, the processing proceeds to a step S3. At the step S3, the timing generation unit 85 refers to a table of the superimposing period table 86 to determine whether the timing generation unit 85 is in a period for superimposing (multiplexing) audio data. Specifically, as described above, a period for superimposing audio data (superimposing data) in a horizontal blanking period is predefined in the superimposing period table 86. The timing generation unit 85 determines on the basis of the definition whether the timing generation unit 85 is now in a period for superimposing (multiplexing) audio data.

When the timing generation unit 85 determines that the timing generation unit 85 is in a horizontal blanking period but not in a period for superimposing audio data, the processing proceeds to a step S7. At the step S7, the timing generation unit 85 controls the encoder 83A to generate 10-bit horizontal or vertical blanking data on the basis of 2-bit horizontal or vertical synchronizing data input from the terminal 91 and then output the 10-bit horizontal or vertical blanking data.

When the 2-bit data is denoted by (C1, C0), the encoder 83A outputs 10-bit control (CTL) data provided for the 2-bit data as shown in FIG. 6, for example, as the horizontal or vertical blanking data.

In the example of FIG. 6, when a 2-bit input is '00,' the blanking data is '0010101011.' When the input is '01,' the blanking data is '1101010100.' When the input is '10,' the blanking data is '0010101010.' When the input is '11,' the blanking data is '1101010101.' The 10-bit blanking data is predetermined as blanking data, and is unique data used neither for video data (pixel data) nor for audio data.

Although the processing of the step S7 is basically performed over the entire blanking period, the processing of the step S7 in the present invention is performed only in a period when audio data is not superimposed. This means that the blanking period is set to a length shorter than the original period.

The step S7 is succeeded by a step S8, at which the encoder 83A outputs the blanking data generated at the step S7 via the TMDS 34.

When the timing generation unit 85 determines at the step S3 that the timing generation unit 85 is now in a period for superimposing audio data, on the other hand, the processing proceeds to a step S4. At the step S4, the timing generation unit 85 controls the switch 81A to turn the contact of the switch 81A to the lower side (as viewed in FIG. 2). At this step S4, the switch 81A selects audio data supplied from the buffer 84, and then outputs the audio data to the encrypting unit 82A.

At the step S5, the encrypting unit 82A encrypts the audio data input via the switch 81A, and then outputs the encrypted audio data to the encoder 83A. At the step S6, the encoder 83A encodes the encrypted audio data input from the encrypting unit 82A, and at the step S8, the encoder 83A outputs the encoded data to the TMDS 34. Thus, the video data (pixel data) and the audio data are encrypted by the common encrypting unit 82A. It is therefore possible to simplify the configuration, miniaturize the apparatus, and lower the cost as compared with a case where the video data (pixel data) and the audio data are provided as data separate from each other.

Transmission processing on the channel B will next be described with reference to the flowchart of FIG. 7.

Figure 5:
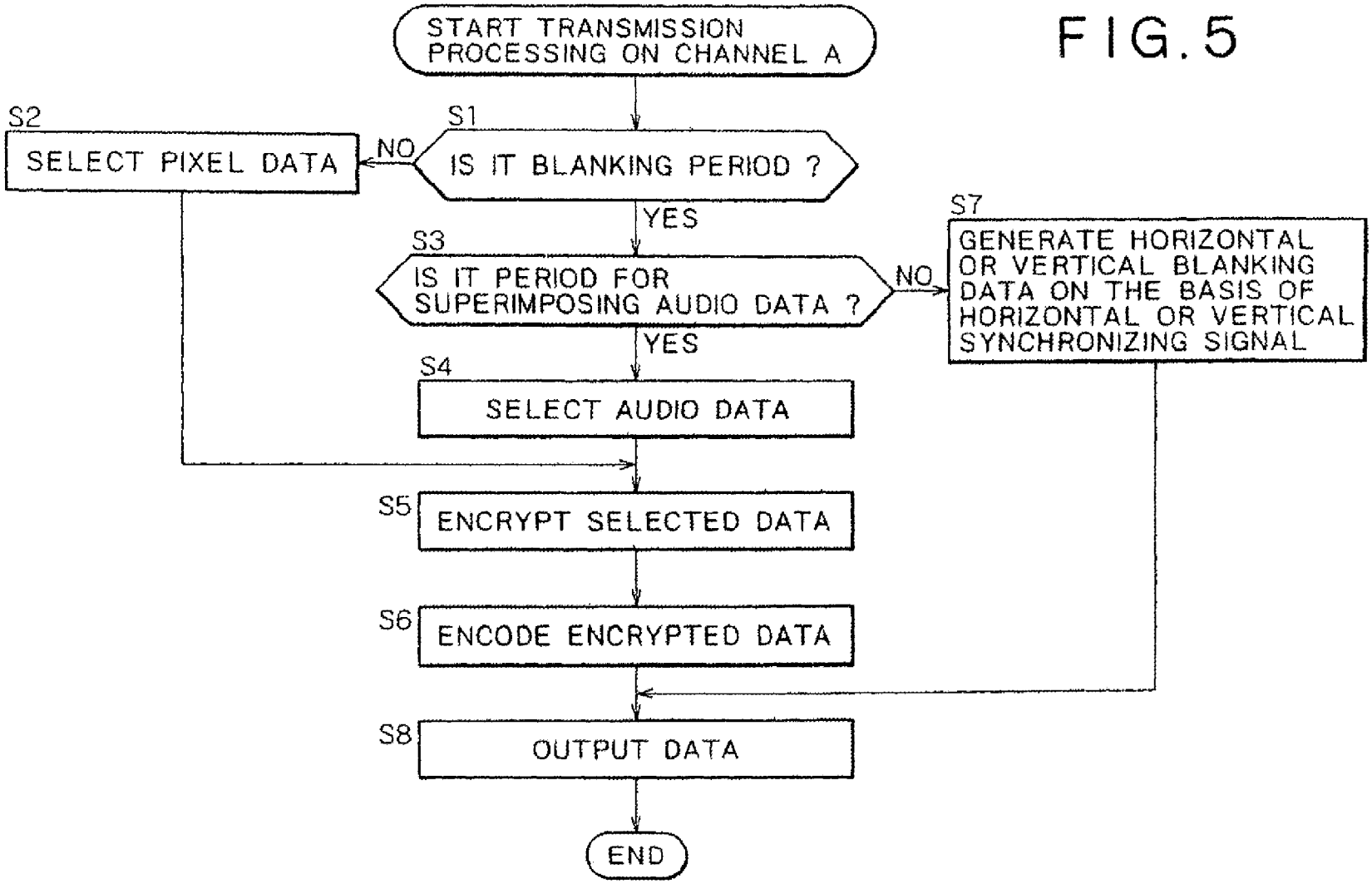
FIG. 5 is a flowchart of assistance in explaining transmission processing on a channel A of the transmitter of FIG. 2.
Figure 7:
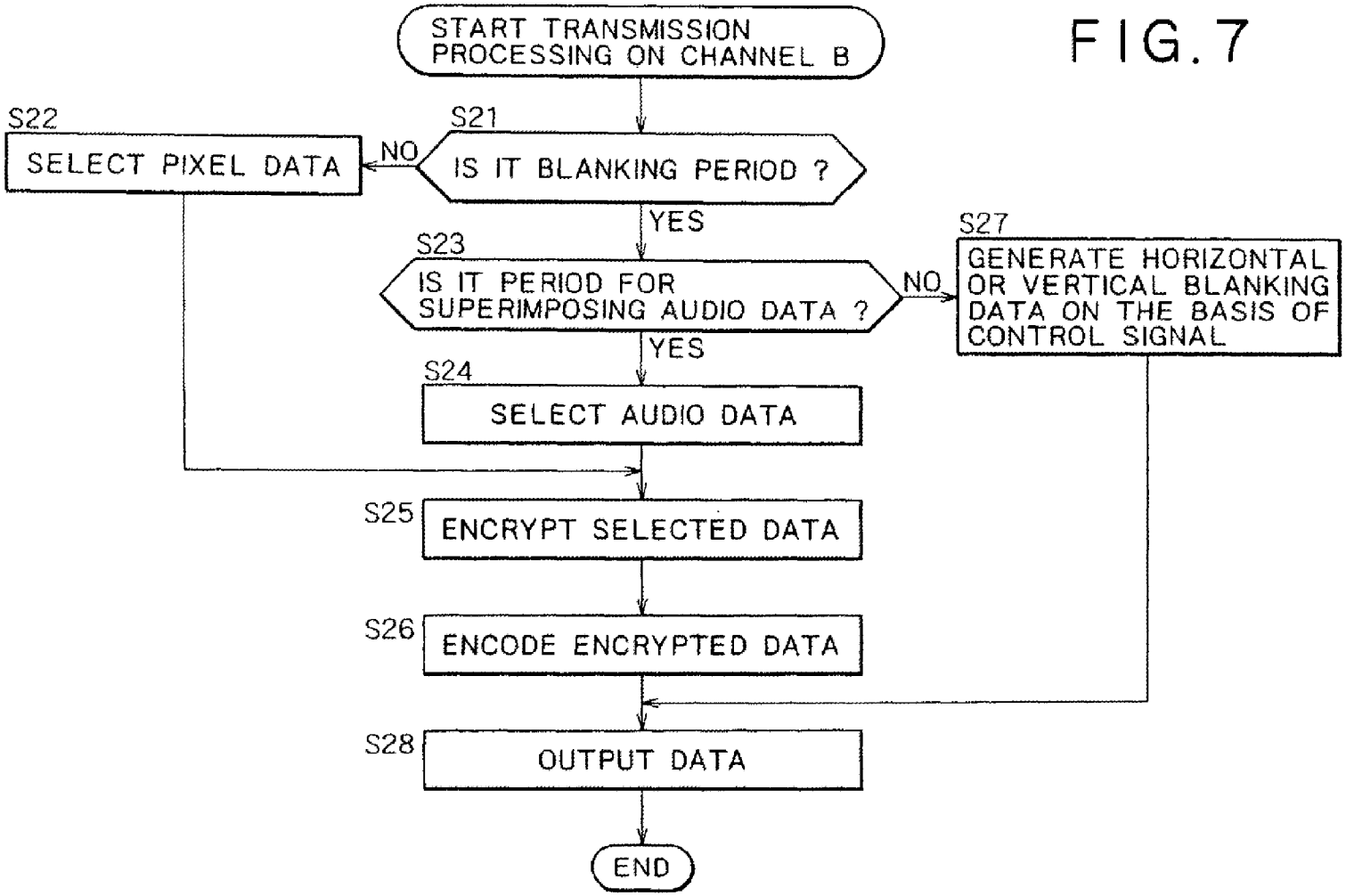
FIG. 7 is a flowchart of assistance in explaining transmission processing on a channel B of the transmitter of FIG. 2.

The processing at steps S21 to S28 in FIG. 7 is basically the same as the processing at the steps S1 to S8 in the transmission processing of the channel A shown in FIG. 5. However, the pixel data selected by the switch 81B at the step S22 is pixel data B, and the data encrypted by the encrypting unit 82B at the step S25 is the pixel data B or the audio data supplied from the buffer 84 selected by the switch 81B.

In addition, at the step S27, the encoder 83B generates 10-bit horizontal or vertical blanking data (FIG. 6) on the basis of the 2-bit control signal supplied from the terminal 92.

The other processing is the same as in FIG. 5.

Figure 8:
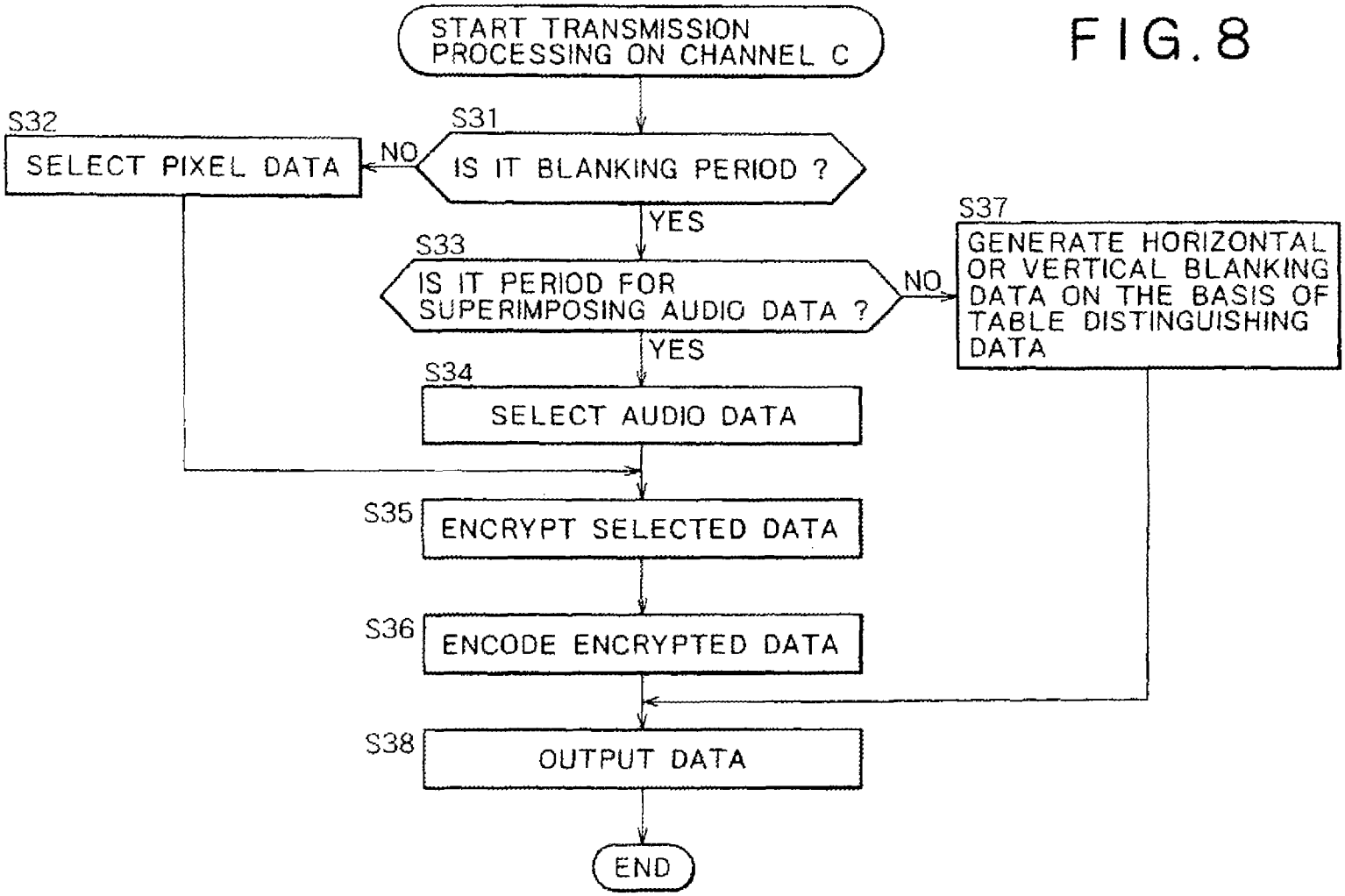
FIG. 8 is a flowchart of assistance in explaining transmission processing on a channel C of the transmitter of FIG. 2.

Transmission processing on the channel C is as shown in FIG. 8. Processing at steps S31 to S38 is basically the same as the processing at the steps S1 to S8 in the flowchart of FIG. 5. However, the data selected by the switch 81C at the step S32 and encrypted by the encrypting unit 82C at the step S35 is pixel data C supplied from the terminal 80C or the audio data supplied from the buffer 84. At the step S37, the encoder 83C generates 10-bit horizontal or vertical blanking data (FIG. 6) on the basis of 2-bit data indicating a superimposing period supplied from the superimposing period table 86.

Figures 9A, 9B, 9C, 9D:
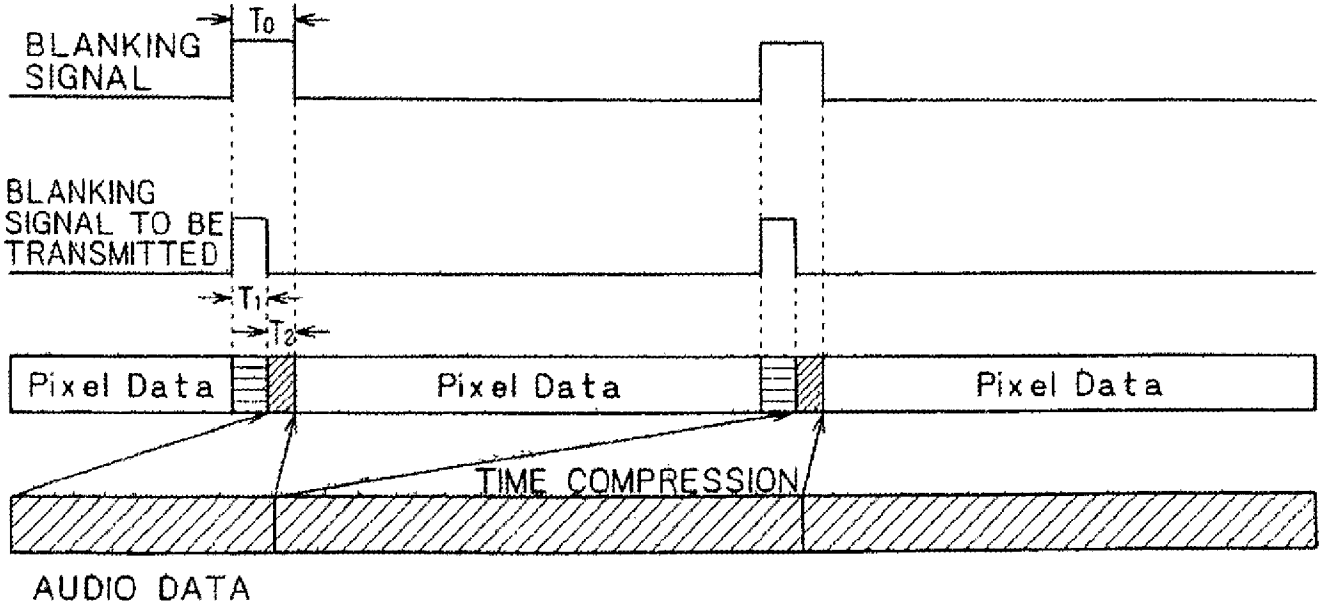
FIGS. 9A, 9B, 9C, and 9D are timing charts of assistance in explaining the transmission processing of the transmitter of FIG. 2.

The processing described above will be described further with reference to the timing charts of FIGS. 9A, 9B, 9C, and 9D. As shown in FIG. 9A, a blanking signal is generated in a cycle of a horizontal scanning line. As described above, the period of the horizontal blanking signal corresponds to 138 pixels in the case of 480p pixel data, 370 pixels in the case of 720p pixel data, and 280 pixels in the case of 1080i pixel data.

As shown in FIG. 9B, a first period $T_1$ of the blanking period $T_0$ is a transmitting blanking period, and a remaining period $T_2$ of the blanking period $T_0$ is a period for multiplexing audio data.

The audio data, which is continuous data as shown in FIG. 9D, is compressed with respect to a time axis by being encoded by the encoders 83A to 83C, and multiplexed into the period $T_2$ as shown in FIG. 9C.

Figures 10A, 10B, 10C:
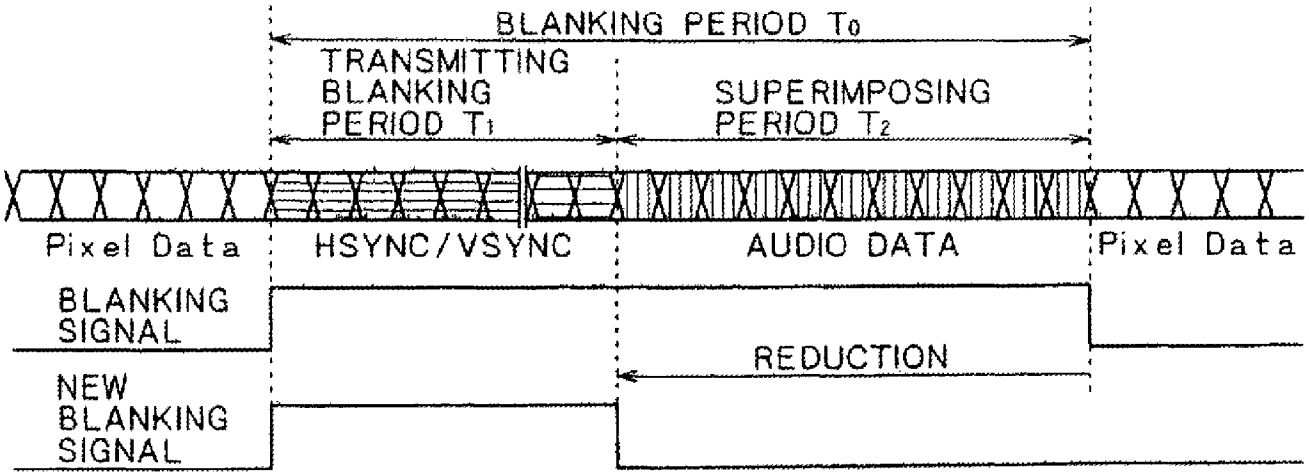
FIGS. 10A, 10B, and 10C are timing charts of assistance in explaining the operation on the channel A of the transmitter of FIG. 2 around a blanking period.

FIGS. 10A, 10B, and 10C show in enlarged dimension data around a blanking period of the channel A. As shown in FIG. 10B, although the period of an original blanking signal is $T_0$, the blanking signal is multiplexed in a manner as shown in FIG. 10A and FIG. 10C only in a period $T_1$ within the period $T_0$. This means that the blanking signal is, as it were, shortened from time period $T_0$ to the period $T_1$. Audio data is multiplexed into a remaining superimposing period $T_2$ obtained by subtracting the period $T_1$ from the period $T_0$. In other words, audio data is multiplexed as data similar to pixel data. In order to distinguish audio data from pixel data on the receiving part, however, distinguishing data indicating the superimposing period $T_2$ is transmitted in the period $T_1$ on the channel C, as described above.

Figures 11A, 11B, 11C:
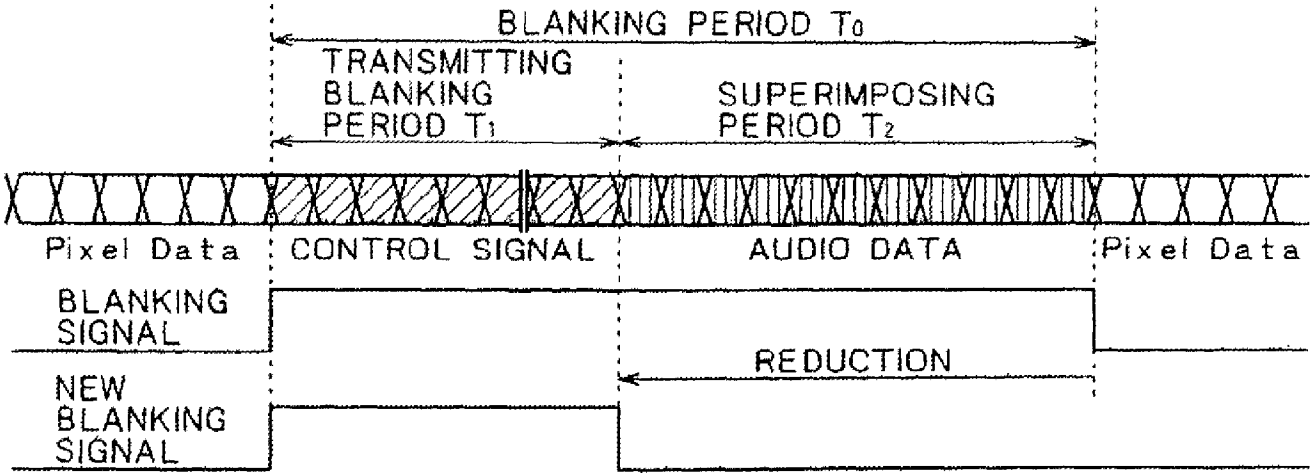
FIGS. 11A, 11B, and 11C are timing charts of assistance in explaining the operation on the channel B of the transmitter of FIG. 2 around a blanking period.
Figures 12A, 12B, 12C:
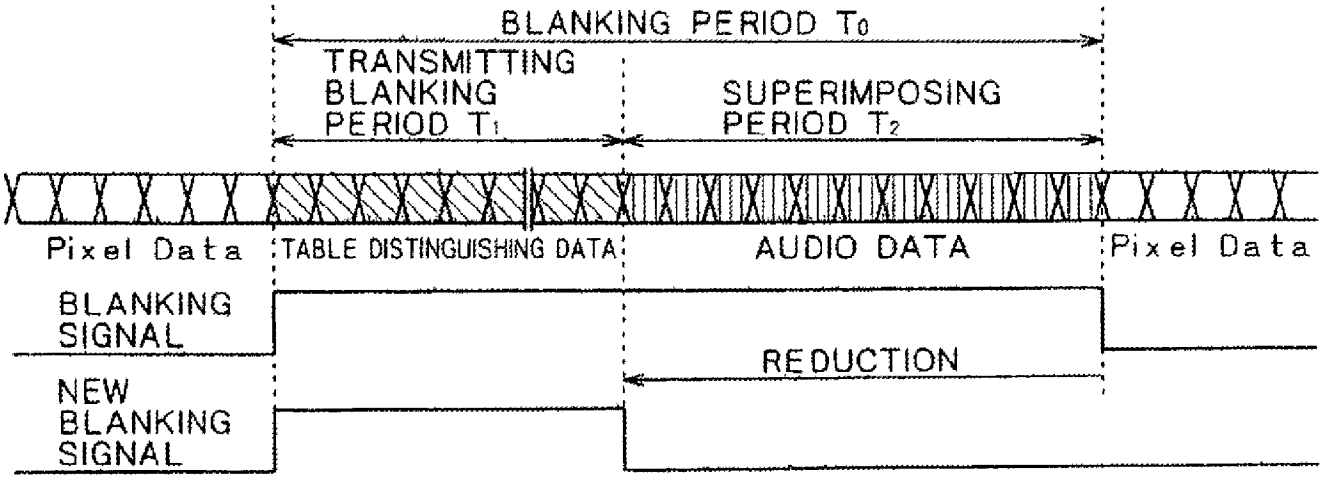
FIGS. 12A, 12B, and 12C are timing charts of assistance in explaining the operation on the channel C of the transmitter of FIG. 2 around a blanking period.

FIGS. 11A, 11B, and 11C show the arrangement of data around a blanking period of the channel B. FIGS. 12A, 12B, and 12C show the arrangement of data around a blanking period of the channel C.

In the period $T_1$, horizontal synchronizing data or vertical synchronizing data is transmitted in the example of FIGS. 10A, 10B, and 10C, whereas a control signal is transmitted in the example of FIGS. 11A, 11B, and 11C, and table distinguishing data is transmitted in the example of FIGS. 12A, 12B, and 12C. That is, as described above, blanking data inserted in the period $T_1$ is data representing the horizontal or vertical synchronizing data (for the channel A), the control signal (for the channel B), or the table distinguishing data (for the channel C).

Figure 13:
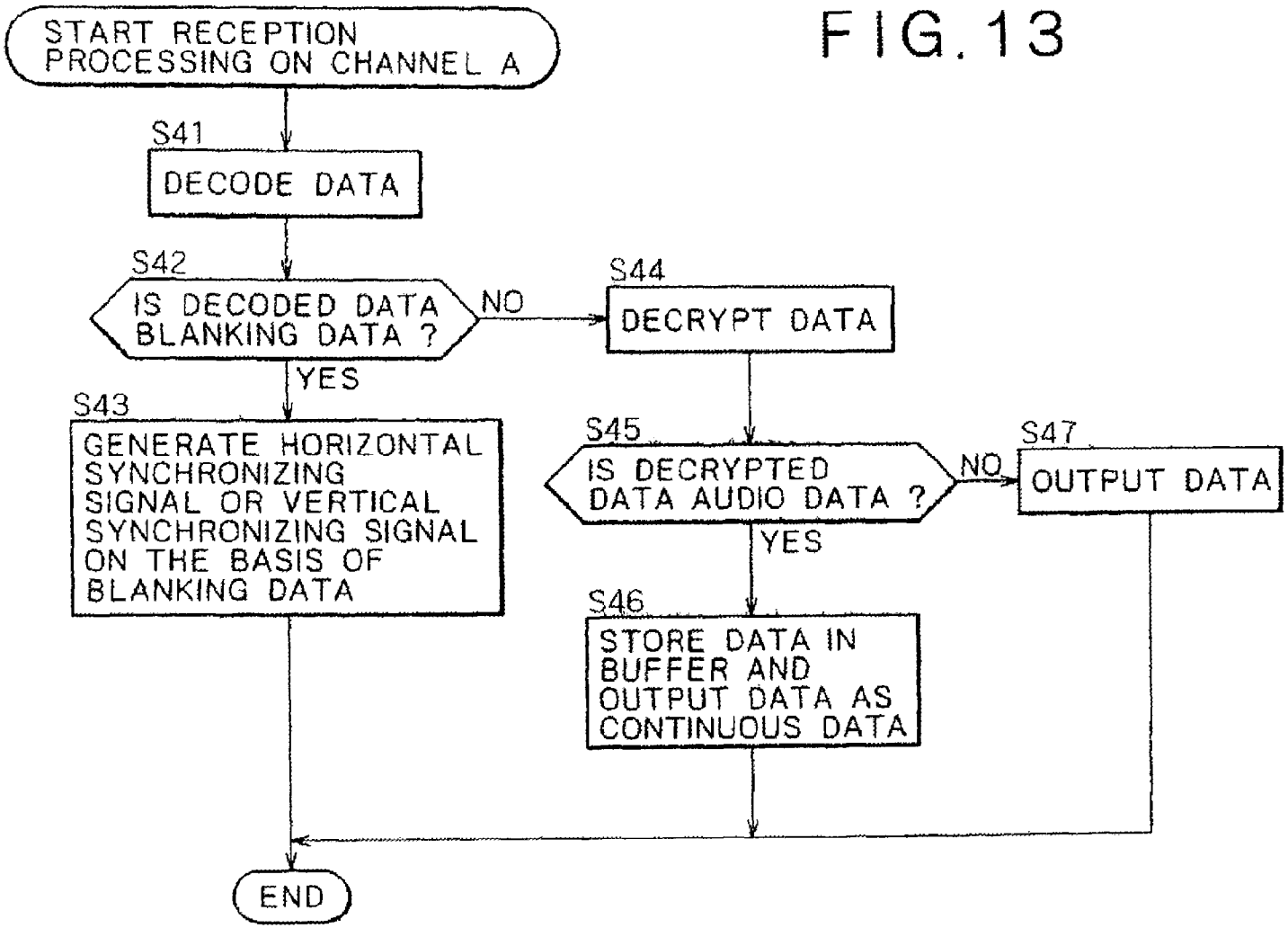
FIG. 13 is a flowchart of assistance in explaining reception processing on a channel A of the receiver of FIG. 4.

The receiving processing of the channel A of the receiver 51 in FIG. 4 will next be described with reference to the flowchart of FIG. 13. At a step S41, the decoder 101A decodes data input thereto.

At a step S42, the decoder 101A determines whether the decoded data is blanking data. When the decoder 101A determines that the decoded data is blanking data, the processing proceeds to a step S43, at which the decoder 101A generates horizontal or vertical synchronizing data (generates 2-bit data corresponding to the 10-bit control code in FIG. 6) on the basis of the blanking data, and then outputs the horizontal or vertical synchronizing data to the H/V sync generating unit 57.

The decoder 101A also outputs data of a period corresponding to the blanking data as data of a set blanking period to the timing generating unit 103. As will be described in detail in the processing at a step S83 in FIG. 15, the timing generating unit 103 corrects (lengthens) the set blanking period to thereby generate a blanking signal of original length.

When the decoder 101A determines at the step S42 that the decoded data is not blanking data, the data is either pixel data or audio data. Therefore, the decoder 101A outputs the data to the decrypting unit 102A. At a step S44, the decrypting unit 102A decrypts the data input thereto. The decrypting unit 102A determines whether the decrypted data is audio data on the basis of a timing signal from the timing generating unit 103 at a step S45. When the decrypting unit 102A determines that the decrypted data is audio data, the processing proceeds to a step S46, at which the audio data is supplied to the buffer 104 to be stored therein.

Specifically, the timing generating unit 103 reads a superimposing period $T_2$ corresponding to table distinguishing data for distinguishing the superimposing period, which data is output by the decoder 101C, from the superimposing period table 105 on the basis of the table distinguishing data. The timing generating unit 103 then outputs a timing signal corresponding to the period $T_2$. The decrypting unit 102A determines that data in the period $T_2$ is audio data.

The buffer 104 is also supplied with audio data decrypted by the decrypting unit 102B or 102C of the channel B or the channel C. The buffer 104 outputs these pieces of audio data as continuous data.

When the decrypting unit 102A determines at the step S45 that the decrypted data is not audio data (when the decrypting unit 102A determines that the decrypted data is pixel data A), on the other hand, the processing proceeds to a step S47, at which the decrypting unit 102A outputs the data to the D/A converter 55.

Figure 14:
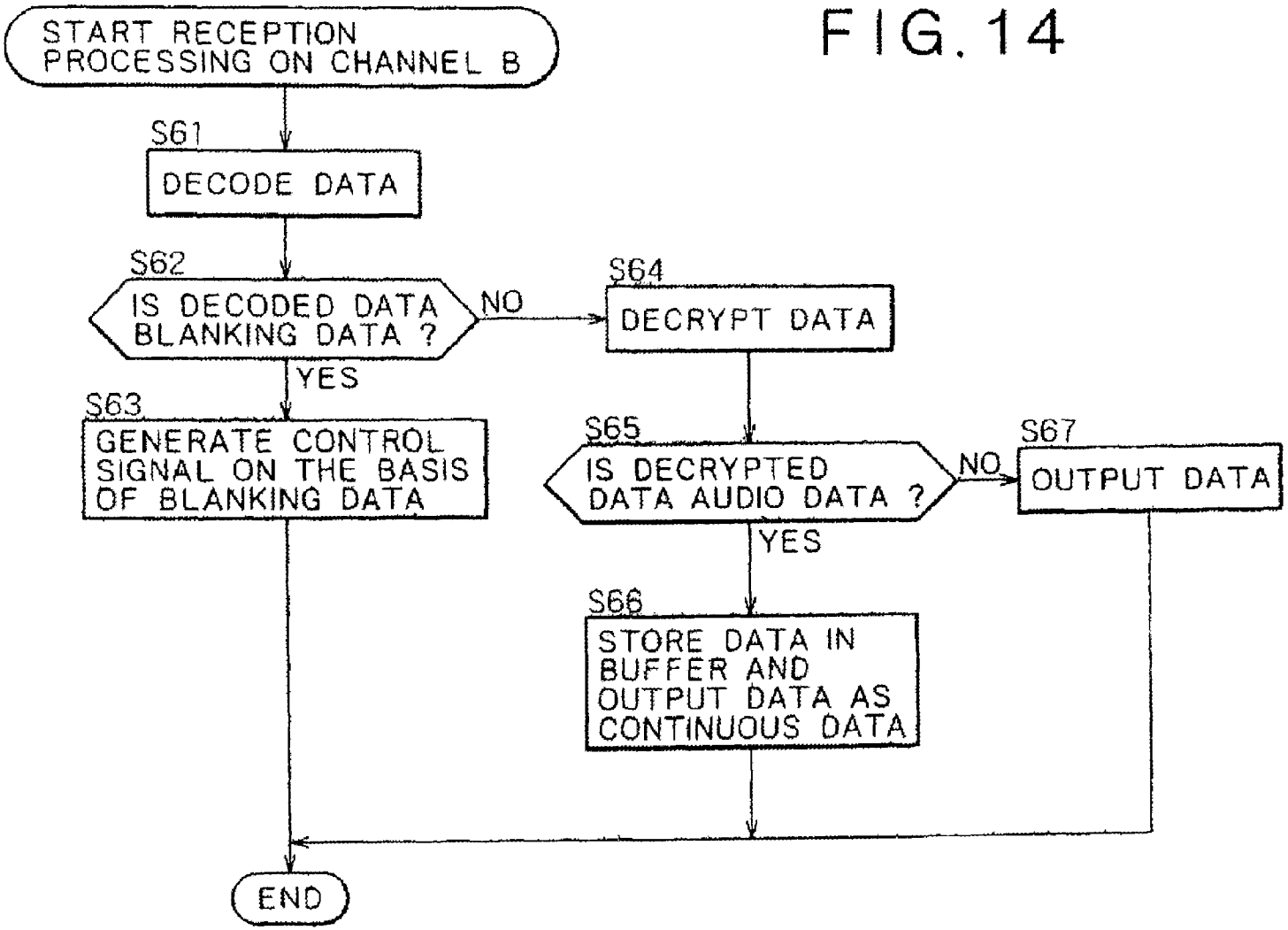
FIG. 14 is a flowchart of assistance in explaining reception processing on a channel B of the receiver of FIG. 4.

FIG. 14 shows the receiving processing of the channel B. The processing at steps S61 to S67 is basically the same as shown in the flowchart of FIG. 13. However, at the step S63, the decoder 101B generates a control signal rather than horizontal synchronizing data or vertical synchronizing data on the basis of blanking data. The control signal is output to the control unit 59.

Figure 15:
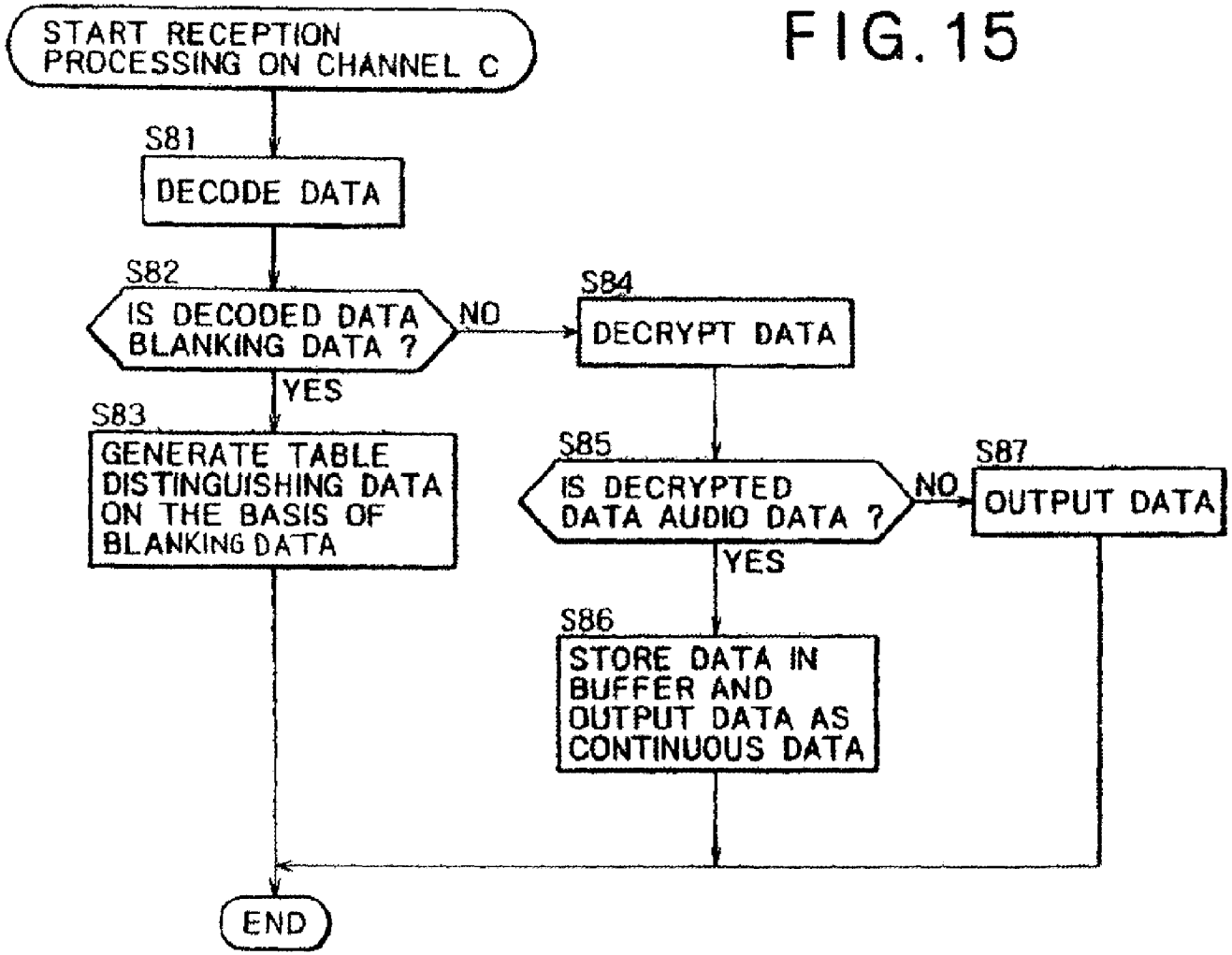
FIG. 15 is a flowchart of assistance in explaining reception processing on a channel C of the receiver of FIG. 4.

The flowchart of FIG. 15 shows the receiving process of the channel C of the receiver 51. The processing at steps S81 to S87 in FIG. 15 is basically the same as the processing at the steps S41 to S48 in FIG. 13. However, the processing at the step S83 in FIG. 15 is different from the processing at the step S43 in FIG. 13. Specifically, at the step S83 in FIG. 15, the decoder 101C generates 2-bit table distinguishing data on the basis of 10-bit blanking data. The table distinguishing data, which allows the superimposing period $T_2$ to be identified, is supplied to the timing generating unit 103.

The timing generating unit 103 reads from the superimposing period table 105 the superimposing period $T_2$ corresponding to the table distinguishing data supplied from the decoder 101C, and then sets the period $T_2$ in an internal memory. The timing generating unit 103 generates a timing signal for separating audio data from pixel data by using the superimposing period $T_2$ until new table distinguishing data is received in a next vertical blanking period.

In addition, the timing generating unit 103 lengthens (corrects) the set blanking period $T_1$ by the period $T_2$ on the basis of the set blanking data supplied from the decoders 101A to 101C and the set superimposing period $T_2$. The timing generating unit 103 generates a blanking signal corresponding to the blanking period $T_0$ of original length, and then outputs the blanking signal to the H/V sync generating unit 57.

Figures 16A, 16B, 16C, 16D:
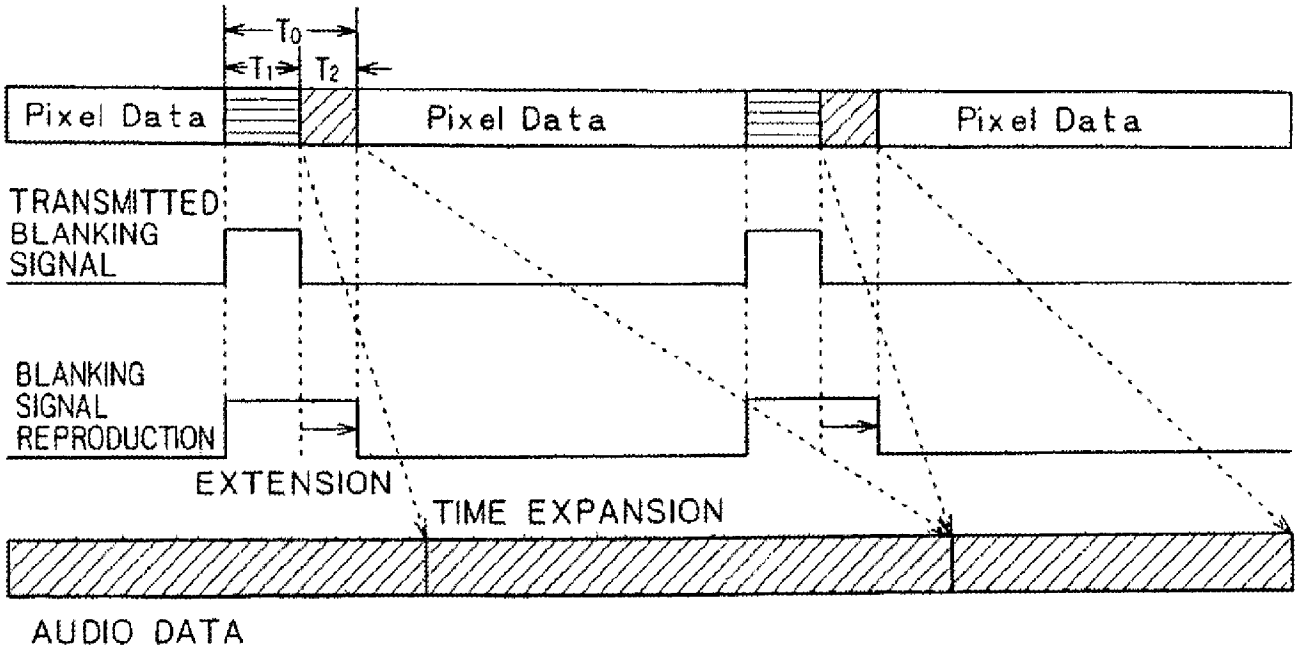
FIGS. 16A, 16B, 16C, and 16D are timing charts of assistance in explaining operation of the receiver of FIG. 4.

The receiving processing described above will be described further with reference to the timing charts of FIGS. 16A, 16B, 16C, and 16D. As shown in FIG. 16A, blanking data is transmitted in a state of being inserted in only the period $T_1$ of the blanking period $T_0$. This means that the blanking period $T_0$ is transmitted in a state of being shortened to the set blanking period $T_1$, as shown in FIG. 16B. If the blanking period $T_0$ remains in this state, audio data inserted in the period $T_2$ is processed as pixel data. Thus, as shown in FIG. 16C, the timing generating unit 103 lengthens (corrects) the set blanking period $T_1$ by the period $T_2$ to thereby generate a correct blanking period, or the period $T_0$ of original length, and then outputs the blanking period to the H/V sync generating unit 57.

As shown in FIG. 16D, the buffer 104 converts divided audio data supplied from the decrypting units 102A to 102C into continuous audio data, and then outputs the continuous audio data to the D/A converter 52.

The processing of inserting table distinguishing data into the period $T_1$ as shown in FIGS. 12A, 12B, and 12C needs to be performed in every horizontal blanking period when the value of the superimposing period $T_2$ is changed for each horizontal scanning line. Usually, however, the superimposing period $T_2$ is not changed frequently. In such a case, table distinguishing data may be multiplexed into only a vertical blanking period.

In the embodiment of FIG. 1, the transmitter 43 of the digital tuner 31 on the transmitting side and the receiver 51 of the monitor 33 on the receiving side retain the superimposing period table 86 and the superimposing period table 105, respectively, and table distinguishing data for indicating which of the tables retained in the superimposing period table 86 and the superimposing period table 105 is to be used is inserted in the blanking period $T_1$ of the channel C. However, the table distinguishing data may be transmitted from the digital tuner 31 side to the monitor 33 side via the DDC 35, for example, forming a transmission line separate from the TMDS 34.

The series of processing steps described above may be carried out not only by hardware but also by software. In such a case, the digital tuner 31 is formed as shown in FIG. 17, for example.

Figure 17:
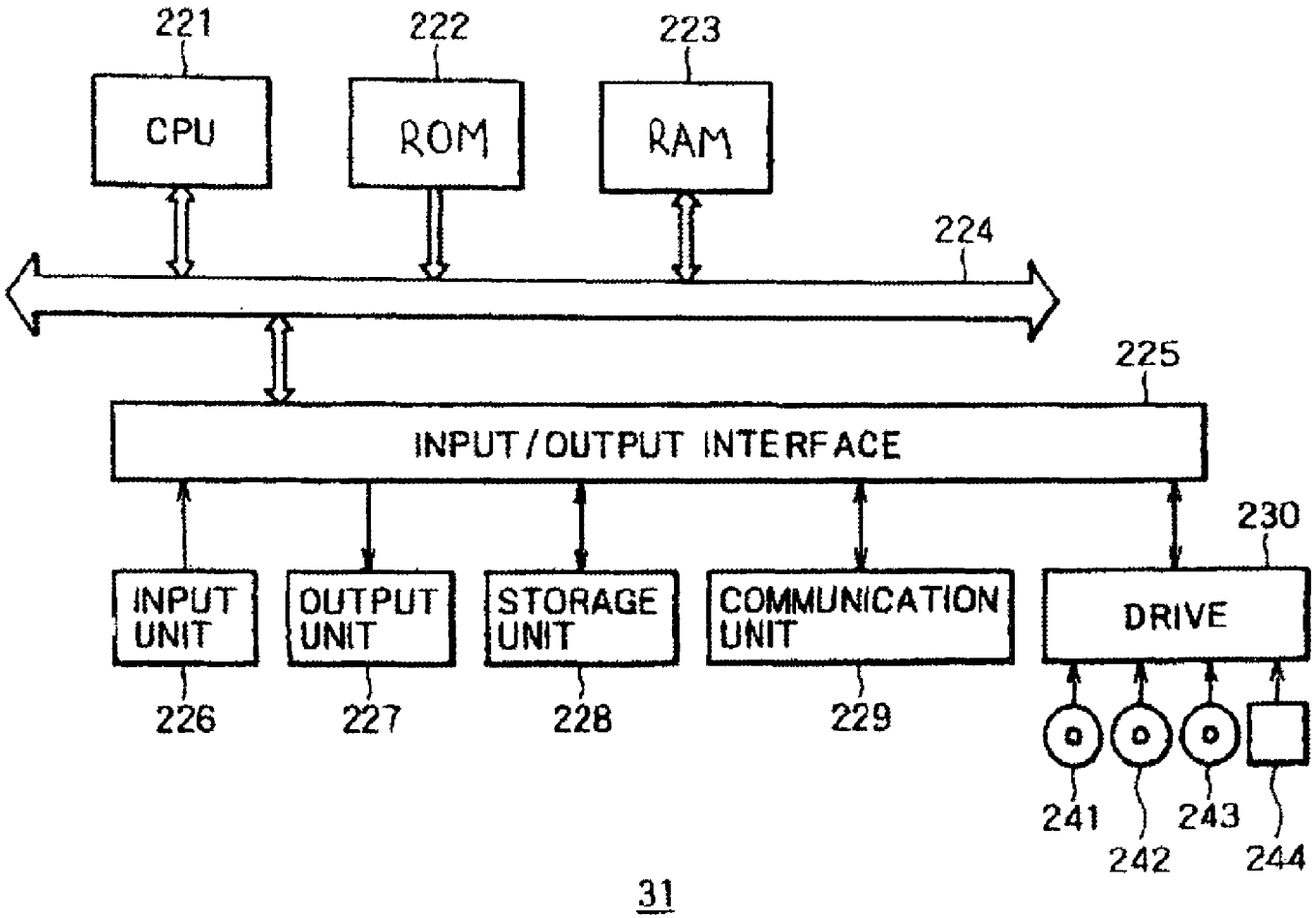
FIG. 17 is a block diagram showing another configuration of the digital tuner of FIG. 2.

A CPU (Central Processing Unit) 221 in FIG. 17 performs various processing according to programs stored in a ROM (Read Only Memory) 222 or programs loaded from a storage unit 228 into a RAM (Random Access Memory) 223. The RAM 223 also stores signals and the like necessary for the CPU 221 to perform various processing, as required.

The CPU 221, the ROM 222, and the RAM 223 are connected to each other via a bus 224. The bus 224 is also connected with an input/output interface 225.

The input/output interface 225 is connected with an input unit 226 formed by a keyboard, a mouse and the like, an output unit 227 formed by a display formed by a CRT, an LCD or the like and a speaker or the like, the storage unit 228 formed by a hard disk or the like, and a communication unit 229 formed by a modem, a terminal adapter or the like. The communication unit 229 performs processing for communication via a network.

When necessary, the input/output interface 225 is also connected with a drive 230 to which a magnetic disk 241, an optical disk 242, a magneto-optical disk 243, a semiconductor memory 244 or the like is inserted as required. Computer programs read from the magnetic disk 241, the optical disk 242, the magneto-optical disk 243, the semiconductor memory 244 and the like are installed in the storage unit 228 as required.

Though not shown in the figure, when the series of processing steps is to be carried out by software, the receiver 51 and the like may also be formed by a computer as with the digital tuner 31. When the series of processing steps is to be carried out by software, a program forming the software is installed from a network or a recording medium onto a computer that is incorporated in special hardware, or a general-purpose personal computer that can perform various functions by installing various programs thereon, for example.

Examples of the recording medium include not only program-recorded packaged media distributed to users to provide the program separately from the apparatus proper, which packaged media are formed by magnetic disks 241 (including floppy disks), optical disks 242 (including CD-ROM (Compact Disk-Read Only Memory) and DVD (Digital Versatile Disk)), magneto-optical disks 243 (including MD (MiniDisk)), or semiconductor memories 244 as shown in FIG. 17, but also the hard disk included in the storage unit 228 and the ROM 222 storing the program, which are supplied to the user in a state of being preincorporated in the apparatus proper.

It is to be noted that in the present specification, the steps describing the program recorded on a recording medium include not only processing steps carried out in time series in the described order, but also processing steps carried out in parallel or individually and not necessarily in time series.

Also, in the present specification, a system denotes the whole apparatus formed by a plurality of apparatus.

As described above, the apparatus and method for information transmission, and the program according to the present invention multiplex a compressed audio signal into a differential period created by setting a blanking period to a predetermined period. It is therefore possible to transmit an audio signal efficiently.

The apparatus and method for information reception, and the program according to the present invention capture the compressed audio signal multiplexed in the multiplexing period of a captured video signal, and correct the blanking period on the basis of the multiplexing period. It is therefore possible to reliably extract the compressed audio signal, recover the length of the original blanking period readily and reliably, and thereby prevent adverse effects on reproduction of the video signal.

According to the system and method for information transmission and reception, and the program according to the present invention, the information transmitting apparatus multiplexes a compressed audio signal into a differential period created by setting a blanking period of a video signal to a predetermined period, and thereby transmits the compressed audio signal, and the information receiving apparatus captures the compressed audio signal multiplexed in the differential period, and corrects the blanking period. Therefore, it is possible to transmit and receive the compressed audio signal other than the video signal readily and reliably in a system capable of transmitting and receiving a video signal, and thus realize a system having no adverse effects on transmission and reception of an original video signal.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

[1. A data transmission apparatus comprising a processor to implement:

a first input unit for inputting video data of a predetermined number of bits;

a second input unit for inputting audio data;

a setting unit for setting, within a blanking period of the video data, a setup period that is shorter than the blanking period;

a multiplexing unit for multiplexing the audio data into a superimposing period, the superimposing period occurring within the blanking period and not including the setup period, and the setup period at least preceding the superimposing period;

a video data transmitting unit for encoding the video data to generate encoded video data having a number of bits greater than the predetermined number of bits and transmitting the encoded video data to a data channel; and a retaining unit for retaining information on the setup period or the superimposing period, wherein the retaining unit retains a correspondence between a type of the video data and the setup period or superimposing period as the information on the setup period or superimposing period, and wherein the multiplexing unit multiplexes the audio data into the superimposing period on the basis of the information retained by the retaining unit, the setup period being used to convey predetermined data other than video data or audio data; and the predetermined data comprising information for identifying the encoded video data and the superimposing period.]

[2. A data transmission apparatus as claimed in claim 1, wherein the setting unit sets the setup period by disposing a blanking signal representing the blanking period only during the setup period and not during the superimposing period.]

[3. A data transmission apparatus as claimed in claim 2, wherein the blanking signal forms a control signal.]

[4. A data transmission apparatus as claimed in claim 1, further comprising a distinguishing information transmitter for transmitting distinguishing information for distinguishing the setup period or the superimposing period.]

[5. A data transmission apparatus as claimed in claim 4, wherein the distinguishing information transmitter transmits the distinguishing information in the setup period of the video data as a type of blanking signal representing a blanking period.]

[6. A data transmission apparatus as claimed in claim 5, wherein the distinguishing information transmitter transmits the distinguishing information in a vertical blanking period.]

[7. A data transmission apparatus as claimed in claim 4, wherein the distinguishing information transmitter transmits the distinguishing information via a transmission line different from a transmission line of the encoded video data.]

[8. A data transmission apparatus as claimed in claim 4, wherein the distinguishing information is information allowing determination of a period from a start point to an end point of the setup period or a period from a start point to an end point of the superimposing period.]

[9. A data transmission apparatus as claimed in claim 1, further comprising a compressing unit for compressing the audio data.]

[10. A data transmission apparatus as claimed in claim 1, further comprising an encrypting unit for encrypting the audio data by a method common with the video data.]

[11. An information receiving apparatus comprising a processor to implement:

a receiver for receiving a transmitted signal;

a first capturing unit for capturing video data from the received signal;

a detecting unit for detecting a blanking period of the captured video data, the blanking period being set to a duration different from the duration of an original blanking period of the video data;

a second capturing unit for capturing information on a superimposing period of the received signal in which audio data is multiplexed, the superimposing period occurring within the original blanking period and not including the blanking period of the captured video data, and the blanking period of the captured video data at least preceding the superimposing period;

a third capturing unit for capturing the audio data from the received signal on the basis of the captured information and superimposing period;

a correcting unit for correcting the detected blanking period on the basis of the captured information on the superimposing period; and a retaining unit for retaining the information on the superimposing period, wherein the retaining unit retains a correspondence between a type of the video data and the superimposing period as the information on the superimposing period, and wherein the second capturing unit captures the information on the superimposing period from the information retained by the retaining unit, data indicative of the duration of the superimposing period being received during the blanking period of the captured video data.]

[12. An information receiving apparatus as claimed in claim 11, further comprising a converting unit for converting the audio data captured by the third capturing unit into a continuous signal.]

[13. An information receiving apparatus as claimed in claim 11, wherein a blanking signal representing the blanking period of the captured video data forms a control signal.]

[14. An information receiving apparatus as claimed in claim 11, further comprising a distinguishing information extracting unit for extracting distinguishing information for distinguishing the superimposing period.]

[15. An information receiving apparatus as claimed in claim 14, wherein the distinguishing information extracting unit extracts the distinguishing information from a blanking signal representing the blanking period of the captured video data, the blanking signal being inserted in the blanking period of the captured video data.]

[16. An information receiving apparatus as claimed in claim 15, wherein the distinguishing information extracting unit extracts the distinguishing information from the blanking signal in a vertical blanking period.]

[17. An information receiving apparatus as claimed in claim 14, wherein the distinguishing information extracting unit extracts the distinguishing information from a signal received via a transmission line different from a transmission line of the captured video data.]

[18. An information receiving apparatus as claimed in claim 14, wherein the distinguishing information is information allowing determination of a period from a start point to an end point of the superimposing period or a period from a start point to an end point of the blanking period of the captured video data.]

[19. An information receiving apparatus as claimed in claim 11, wherein the audio data is compressed audio data, and further comprising an expanding unit for expanding the compressed audio data.]

[20. An information receiving apparatus as claimed in claim 11, further comprising a decrypting unit for decrypting the audio data by a method common with the video data, the audio data being encrypted by a method common with the video data.]

*21. An information processing apparatus, comprising:*

*a first capturing unit for capturing a video signal;*

*a second capturing unit capturing a compressed audio signal;*

*a transmitter that*

*sets a blanking period of said video signal to a first period of a length different from an original period;*

*multiplexes said compressed audio signal into a second period corresponding to a difference between the blanking period and the first period;*

*transmits said video signal having the compressed audio signal multiplexed therein, in which data indicative of duration of the second period is transmitted during a blanking period of the video signal; and*

*a communication unit that performs processing for communication via a network.*

*22. The information processing apparatus according to claim 21, wherein the transmitter sets the first period by disposing, only in the first period, a blanking signal.*

*23. The information processing apparatus according to claim 21, wherein the transmitter transmits the video signal via transition minimized differential signaling (TMDS).*

*24. An information processing method, comprising:*

*capturing a video signal;*

*capturing a compressed audio signal;*

*setting a blanking period of said video signal to a first period of a length different from an original period;*

*multiplexing said compressed audio signal into a second period corresponding to a difference between the blanking period and the first period;*

*performing processing for communication via a network; and*

*transmitting said video signal having the compressed audio signal multiplexed therein,*

*in which data indicative of duration of the second period is transmitted during a blanking period of the video signal.*

*25. The information processing method according to claim 24, wherein the step of setting the first period comprises disposing, only in the first period, a blanking signal.*

*26. The information processing method according to claim 24, wherein the step of transmitting comprises transmitting the video signal via transition minimized differential signaling (TMDS).*

*27. A processor for an apparatus comprising a display and a speaker, the processor comprising:*

*a processing device and a memory configured to store instructions which, when executed by the processing device, control the apparatus to:*

*perform processing for communication via a network;*

*capture a video signal;*

*capture a compressed audio signal;*

*set a blanking period of said video signal to a first period of a length different from an original period;*

*multiplex said compressed audio signal into a second period corresponding to a difference between the blanking period and the first period; and*

*transmit said video signal having the compressed audio signal multiplexed therein,*

*in which data indicative of duration of the second period is transmitted during a blanking period of the video signal.*

*28. The processor according to claim 27, wherein the first period is set by disposing, only in the first period, a blanking signal.*

*29. The processor according to claim 27, wherein the video signal is transmitted via transition minimized differential signaling (TMDS).*

*30. An information processing apparatus comprising a display, a speaker and a processor, wherein, the processor controls the apparatus to:*

*perform processing for communication via a network;*

*capture a video signal;*

*capture a compressed audio signal;*

*set a blanking period of said video signal to a first period of a length different from an original period;*

*multiplex said compressed audio signal into a second period corresponding to a difference between the blanking period and the first period; and*

*transmit said video signal having the compressed audio signal multiplexed therein,*

*in which data indicative of duration of the second period is transmitted during a blanking period of the video signal.*

*31. The information processing apparatus according to claim 30, wherein setting the first period comprises disposing, only in the first period, a blanking signal.*

*32. The information processing apparatus according to claim 30, wherein the video signal is transmitted via transition minimized differential signaling (TMDS).*

*33. The information processing apparatus according to any one of claim 21, 27 and 30, wherein audio data of the compressed audio signal is compressed on the time axis.*

*34. The information processing apparatus according to claim 33, further comprising:*

*an encoding unit that encodes video data of the video signal and the audio data into 10 bits.*

*35. The information processing apparatus according to claim 34, further comprising:*

*an encrypting circuit that encrypts the video data and the audio data.*

*36. The information processing apparatus according to claim 34, further comprising:*

*a buffer that stores the audio data.*

*37. An information processing apparatus, comprising:*

*a display; and*

*a receiver that*

*receives a transmitted signal;*

*captures a video signal from the received signal;*

*detects a blanking period of said captured video signal, said blanking period being set to a length different from an original period;*

*captures information on a multiplexing period in which a compressed audio signal is multiplexed;*

*captures said multiplexed compressed audio signal from said captured video signal on the basis of said captured information on said multiplexing period;*

*corrects said detected blanking period on the basis of said captured information on said multiplexing period, in which data indicative of duration of the multiplexing period is received during a blanking period of the video signal; and*

*outputs the video signal to the display.*

*38. The information processing apparatus according to claim 37, wherein the receiver receives the transmitted signal via transition minimized differential signaling (TMDS).*

*39. An information processing method, comprising:*

*receiving a transmitted signal;*

*capturing a video signal from the received signal;*

*detecting in a blanking period of said captured video signal, said blanking period being set to a length different from an original period;*

*capturing information on a multiplexing period in which a compressed audio signal is multiplexed;*

*capturing said multiplexed compressed audio signal from said captured video signal on the basis of said captured information on said multiplexing period;*

*correcting said detected blanking period on the basis of said captured information on said multiplexing period, in which data indicative of duration of the multiplexing period is received during a blanking period of the video signal; and*

*outputting the video signal to a display.*

*40. The information processing method according to claim 39, wherein the step of receiving comprises receiving the transmitted signal via transition minimized differential signaling (TMDS).*

*41. A processor for an apparatus comprising a display, the processor comprising:*

*a processing device and a memory configured to store instructions which, when executed by the processing device, control the apparatus to:*

*receive a transmitted signal;*

*capture a video signal from the received signal;*

*detect a blanking period of said captured video signal, said blanking period being set to a length different from an original period;*

*capture information on a multiplexing period in which a compressed audio signal is multiplexed;*

*capture said multiplexed compressed audio signal from said captured video signal on the basis of said captured information on said multiplexing period;*

*correct said detected blanking period on the basis of said captured information on said multiplexing period, in which data indicative of duration of the multiplexing period is received during a blanking period of the video signal; and*

*output the video signal to the display.*

*42. The processor according to claim 41, wherein the transmitted signal is transmitted via transition minimized differential signaling (TMDS).*

*43. An information processing apparatus comprising a display and a processor, wherein, the processor controls the apparatus to:*

*receive a transmitted signal;*

*capture a video signal from the received signal;*

*detect a blanking period of said captured video signal, said blanking period being set to a length different from an original period;*

*capture information on a multiplexing period in which a compressed audio signal is multiplexed;*

*capture said multiplexed compressed audio signal from said captured video signal on the basis of said captured information on said multiplexing period;*

*correct said detected blanking period on the basis of said captured information on said multiplexing period, in which data indicative of duration of the multiplexing period is received during a blanking period of the video signal; and*

*output the video signal to the display.*

*44. The information processing apparatus according to claim 43, wherein the transmitted signal is transmitted via transition minimized differential signaling (TMDS).*

*45. The information processing apparatus according to any one of claim 37, 41, and 43, wherein audio data of the compressed audio signal is compressed on the time axis.*

*46. The information processing apparatus according to claim 45, further comprising:*

*an encoding unit that encodes video data of the video signal and the audio data into 10 bits.*

*47. The information processing apparatus according to claim 46, further comprising:*

*an encrypting circuit that encrypts the video data and the audio data.*

*48. The information processing apparatus according to claim 46, further comprising:*

*a buffer that stores the audio data.*

* * * * *